United States Patent [19]

Demopoulos et al.

[11] Patent Number: 5,201,942
[45] Date of Patent: Apr. 13, 1993

[54] RECOVERY OF RHODIUM

[75] Inventors: George P. Demopoulos, Outremont; Elyse Benguerel, Montreal; Garfield B. Harris, Beaconsfield, all of Canada

[73] Assignee: McGill University, Montreal, Canada

[21] Appl. No.: 793,638

[22] Filed: Nov. 18, 1991

[51] Int. Cl.$^5$ ............................................. C22B 11/04
[52] U.S. Cl. ............................................. 75/744; 423/22
[58] Field of Search ............................... 75/744; 423/22

[56] References Cited

U.S. PATENT DOCUMENTS

| 4,077,800 | 3/1978 | Peka | 75/744 |
| 4,155,750 | 5/1979 | Edwards | 423/22 |
| 4,364,907 | 12/1982 | Barnes | 423/22 |
| 4,668,289 | 5/1987 | Langer | 75/744 |
| 4,945,075 | 7/1990 | Cushman | 423/22 |

FOREIGN PATENT DOCUMENTS 03249143 11/1991 Japan.

Primary Examiner—Peter D. Rosenberg
Attorney, Agent, or Firm—Bachman & LaPointe

[57] ABSTRACT

Rhodium is recovered from an aqueous precious metal solution by first contacting the solution with stannous chloride at a Sn:Rh molar ratio of at least 2:1 to produce activated Rh solution; solvent extracting rhodium from the activated solution with an organic extractant to produce an organic phase containing Rh; the Rh can be recovered from the organic phases by burning-off the organic, precipitating Rh by reduction or stripping with a stripping agent and recovering Rh from an Rh-loaded stripping agent; the method produces high yields of Rh in short periods as compared with time consuming prior procedures.

22 Claims, 21 Drawing Sheets

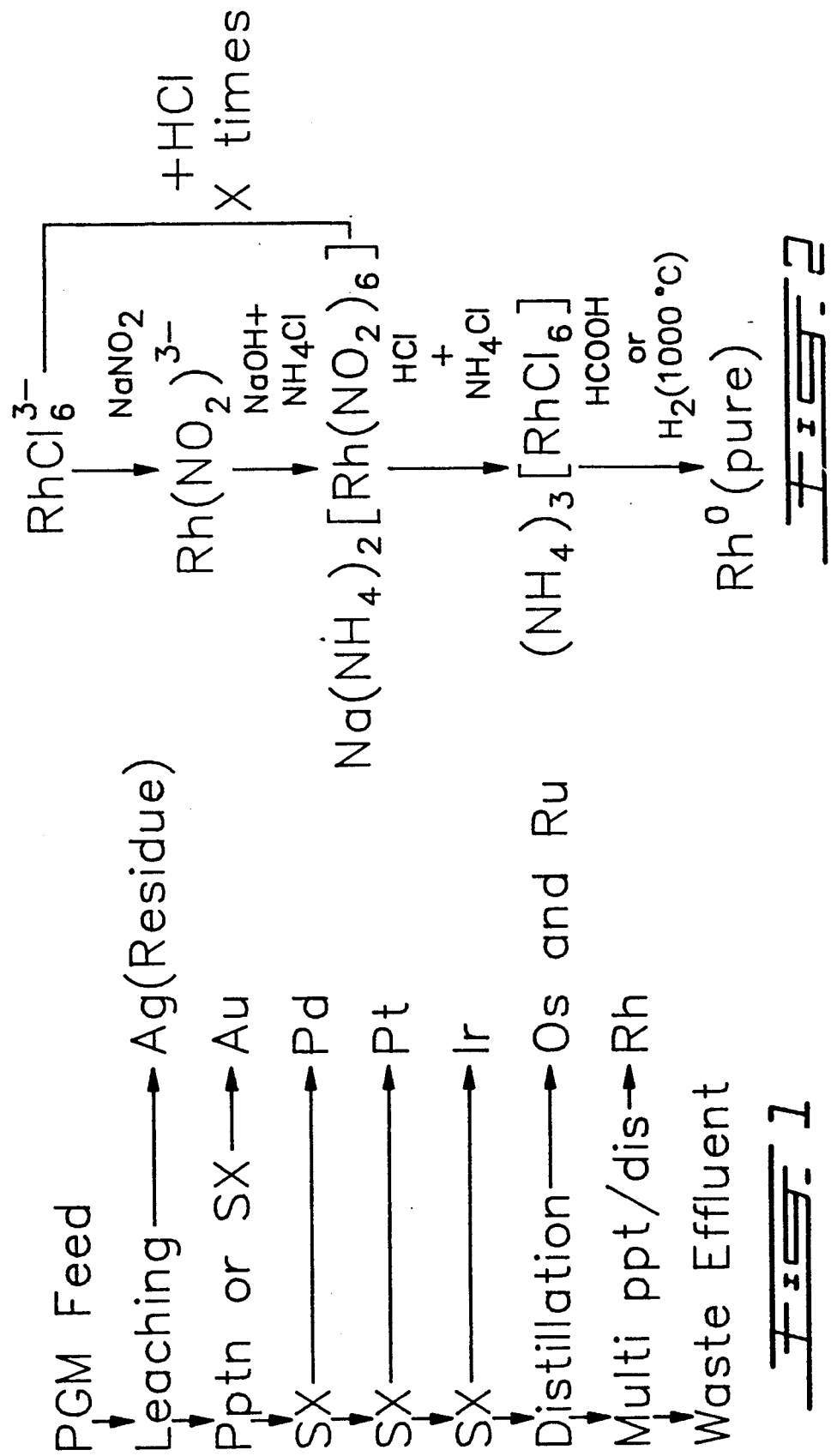

```
Rh AQUEOUS FEED
        │
        │  ADD >10 Sn(II) PER Rh
        │  IN FEED (MOLAR RATIO)
        │  (HEAT AT 60°C FOR 15 MIN)
        ▼
ACTIVATED Rh ──────────────► BARREN RAFF
   FEED          ┌──────────────────┐
                 │    LOADING       │◄──────────┐
                 │   (KELEX 100)    │           │
                 │   1-2 CONTACTS   │           │
                 └──────────────────┘           │
                         │                ┌──────────────┐
LOADED                   │                │  ALTERNATE   │
ORGANIC                  │                │   WASHING    │
                         │                │ (1) 2.7M HCl │
                         ▼                │ (2) ACIDIFIED H2O │
                 ┌──────────────────┐     └──────────────┘
                 │   SCRUBBING      │            ▲
                 │    1-8M HCl      │      STRIPPED
                 │   2 CONTACTS     │      ORGANIC
                 └──────────────────┘            │
                         │                ┌──────────────┐
                         │                │ Sn STRIPPING │
                         │                │  (1M NaOH)   │
                         ▼                └──────────────┘
                 ┌──────────────────┐            ▲
                 │   STRIPPING      │            │
                 │  (1.7M H2SO4     │────────────┘
                 │   +1M Na2SO4)    │
                 │ MULTIPLE CONTACTS│
                 └──────────────────┘
                         │  2:1 Sn:Rh STRIP SOLUTION
                         ▼  SEPARATION
                    Rh METAL
                    RECOVERY
```

FIG. 30

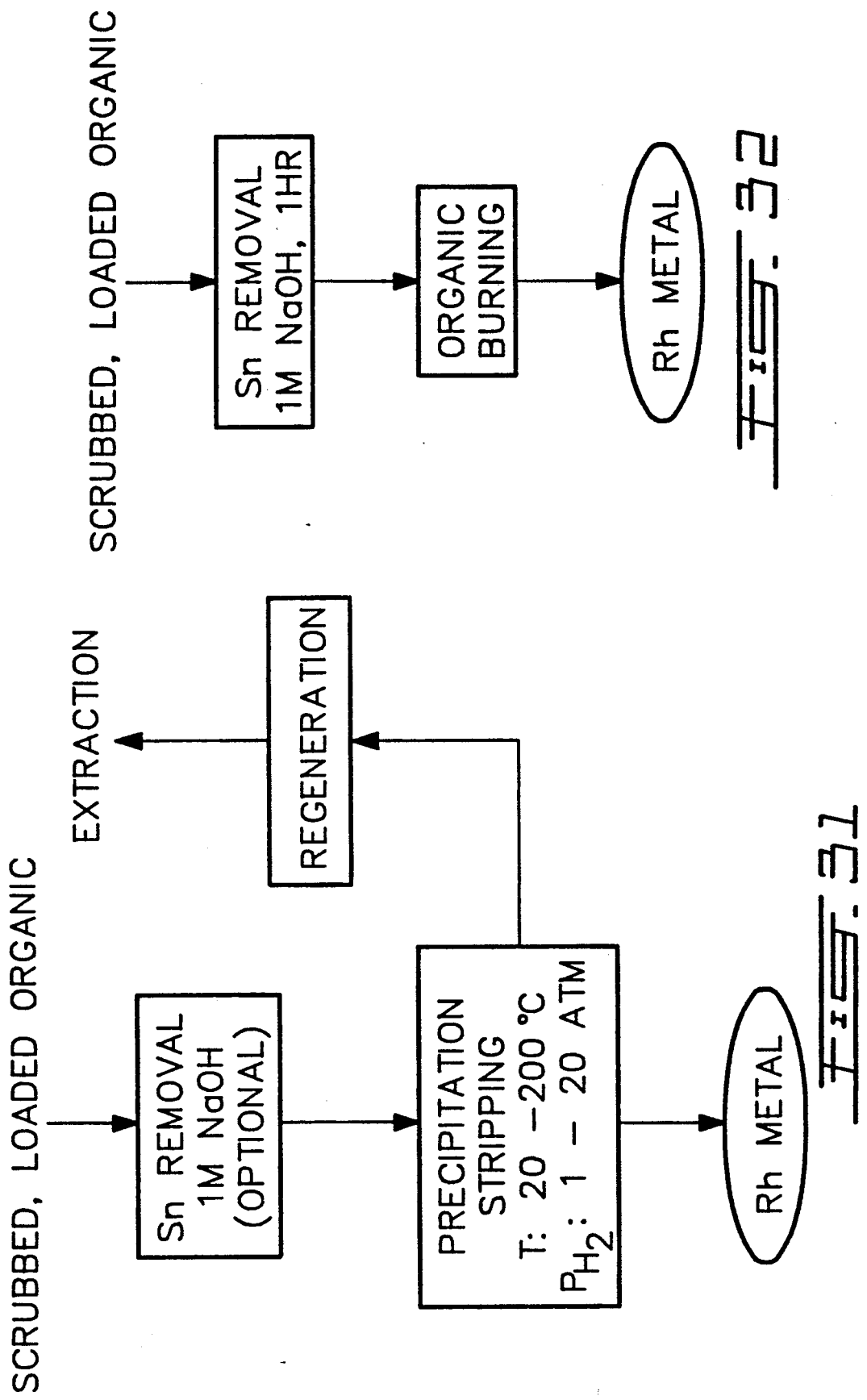

RECOVERY OF RHODIUM

BACKGROUND OF THE INVENTION i) Field of the Invention

This invention relates to the recovery of rhodium from aqueous solution, more especially to the recovery of rhodium from industrially produced aqueous precious metal solutions.

ii) Brief Description of Prior Art

The separation and purification of rhodium (Rh) from the other precious metals is one of the most difficult and pressing areas in precious metal refining at the present time. This situation arises mainly because of the complex solution chemistry of Rh in chloride containing aqueous solutions. The complexes formed by Rh in these types of solutions are such that modern recovery processes such as solvent extraction (SX) which have been implemented for the recovery of the other platinum group metals (PGMs) cannot easily be applied to the recovery of Rh and thus far, no industrially acceptable solvent extraction system has been developed for Rh.

Rhodium occurs together in nature with the other PGMs as well as with silver and gold either as native alloys in placer deposits or in lode deposits or in lode deposits where they are associated with Cu and Ni. It is from the lode deposits that the PGMs are most frequently recovered. Because the PGMs occur together, it is important to devise techniques to separate them and to purify and recover each of the metals separately. Originally PGMs were separated after dissolution in oxidizing chloride leach liquors by the application of a series of precipitation-dissolution steps adopted from analytical chemistry methods. This was the most common route until about the middle nineteen seventies. Since then, the major refining companies have considerably modernized their processes by implementing the more efficient separation technique of solvent extraction and to a lesser degree, ion exchange.

In virtually all precious metal recovery systems, Rh is the last metal recovered and it is recovered through a complicated precipitation technique rather than through the more modern and efficient technique of solvent extraction.

The precipitation-dissolution scheme for the recovery of Rh is not considered satisfactory by most PGM refiners because of its numerous drawbacks. It is a lengthy process, sometimes taking as long as 4 to 6 months for the final recovery of pure Rh metal and therefore, there is a high value of metal which is locked-up in the processing plant. The technique is also quite tedious as the precipitation must be carried out a number of times in order to ensure that the final product is of acceptable purity and this makes the overall process labour intensive and costly.

In the precipitation - purification method, the first step involves the formation of the nitrite complex $[Rh(NO_2)_6]^{3-}$ from $RhCl_6^{3-}$. Because this complex is extremely stable to hydrolysis, the impure Rh-containing solution can be subjected to neutralization with NaOH in order that some of the impurities be precipitated through hydrolysis. After a filtration stage, the Rh in solution is precipitated with ammonia and sodium (from the NaOH) as $Na(NH_4)_2[Rh(NO_2)_6]$ which is a partially selective precipitation step over the other PGMs which may also be present in the Rh solution. For this precipitation, however, it is important that a high concentration of ammonia be used in order to suppress the solubility of this Rh complex to achieve almost complete Rh precipitation. After another filtration stage, the precipitate is redissolved in HCl and depending on the purity of the solution, the process is started over at the nitriting step.

It is this cycle of precipitation-dissolution stages that renders this process inefficient and tedious. Once the ammonia-nitrite Rh complex is of acceptable purity, the final dissolution in HCl is followed by the precipitation of Rh with ammonia to give $(NH_4)_3[RhCl_6]$. It is not only important that the concentration of ammonia be high to suppress the solubility of the Rh compound but, as well, that the chloride concentration be high since it is the hexachloro-complex which is precipitated and therefore, the hexachloro-complex must be available in solution. The last step involves the reduction of Rh to the metallic state either directly from this solution with formic acid or by calcining the complex in the presence of $H_2(g)$ at about 1000° C.

Rh metal is of high value (about $4,000 U.S./oz in mid-1991) and with the rapidly increasing demand for automobile catalytic converters which utilize Rh, the need to develop more efficient recovery processes such as solvent extraction for Rh is becoming more urgent. The difficulty in developing such systems, however, lies in the chemical complexity of Rh in Cl-containing aqueous solutions.

The main oxidation state of Rh is +III although +I and others are known to exist though to a much lesser extent. The anionic complexes of rhodium are more labile than those of other PGMs, whereas the cationic and neutral complexes are quite inert.

Rhodium (III) readily forms octahedral complexes, as do most $d^6$ configurations, with anions, halides, and oxygen-containing ligands. In terms of solvent extraction, highly charged octahedral complexes such as $RhCl_6^{3-}$ are particularly difficult to extract due to steric effects because it is difficult to pack three organic molecules around a single anion.

SUMMARY OF THE INVENTION

It is an object of this invention to provide a method for the recovery of rhodium from aqueous solutions, and in particular from industrially produced, aqueous precious metal solutions.

In accordance with the invention there is provided a method of recovering rhodium from an aqueous solution containing rhodium comprising: i) contacting an aqueous solution containing rhodium with stannous chloride at a Sn:Rh molar ratio of at least 2:1 to produce an activated Rh solution, ii) solvent extracting rhodium from the activated solution with an organic extractant in an organic vehicle with formation of an aqueous phase, derived from said aqueous solution, of diminished Rh content, and an organic phase containing Rh, and iii) recovering rhodium from the organic phase.

The method has particular application to aqueous acidic chloride ion containing solutions developed in the extraction of precious metals, for example, mining solutions, and from which the other precious metals and silver and gold have been removed, usually in the sequence Ag, Ru/Os, Au, Pd, Pt and Ir.

DESCRIPTION OF PREFERRED EMBODIMENTS

Rh Chloride Complexes and SnCl$_2$ a) Rh in Chloride Solution

A variety of rhodium chloro-aquo complexes exist in solution. Starting with hexachlororhodate (RhCl$_6^{3-}$) substitution reactions of the following kind occur:

$$RhCl_6^{3-} + H_2O \longrightarrow RhCl_5(H_2O)^{2-} + Cl^-$$

$$RhCl_5(H_2O)^{2-} + H_2O \longrightarrow RhCl_4(H_2O)_2^- + Cl^-$$

$$RhCl(H_2O)_5^{2+} + H_2O \longrightarrow Rh(H_2O)_6^{3+} + Cl^-$$

The species range from the completely aquated hexaaquorhodate, $Rh(H_2O)_6^{3+}$, to hexachlororhodate, $RhCl_6^{3-}$. Mixed aquo-chloro complexes which can be described as $[RhCl_{6-n}(H_2)_n]^{n-3}$ also exist in equilibrium with each other an with one or both of the above species. The extent to which each complex exists depends primarily on the chloride concentration and also, to some extent, on the temperature, age, and pH of the solution.

It has been found that at a pH above 2.9, the chloro-aquo complexes undergo hydrolysis as follows:

$$[RhCl_{6-n}(H_2O)_n]^{n-3} \longrightarrow [RhCl_{6-n}(H_2O)_{n-1}OH]^{n-1-3},$$
where n ≥ 1

This adds to the number of species which can already be found in a typical Rh chloride aqueous solution.

Also adding to the variety of complexes are chloride- and oxygen-bridged polymer Rh species thought to be present in aqueous Rh chloride systems.

At high Cl$^-$ concentrations, the main rhodium species are $RhCl_6^{3-}$ and $RhCl_5(H_2O)^{2-}$ although $RhCl_4(H_2O)_2^-$ is also found to exist to some lesser extent. As the Cl$^-$ concentration decreases in an aqueous solution, the aquation reactions occur more easily and extensively. Also, as the temperature of the solution increases, so does the rate of aquation.

Thus many mixed chloro-aquo complexes exist in solution as a result of aging and since these species may undergo ligand substitution at different rates, different complexes exhibiting different extractability may be produced in an aged solution.

b) Rh in Sulfate Solutions

Because gold is sometimes recovered through the use of SO$_2$ reduction, some PGM refining solutions contain a considerable amount of SO$_4^{2-}$. The aqueous chemistry of Rh(III) in sulfate solutions has not been as intensively studied as that of chloride solutions, however, Rh-sulfate complexes which have been reported include $Rh_2(SO_4)_3$ and $[Rh(SO_4)_2]^-$.

The studies which have been performed start with the dissolution of Rh(OH)$_3$ in H$_2$SO$_4$ to obtain, first, $Rh(H_2O)_6^{3+}$ and then, depending on the temperature and sulfate concentration, a number of mixed complexes are formed. These include mixed aquo-hydroxy Rh complexes, mixed aquo-hydroxy-sulfate complexes and oxy-sulfate-bisulfate Rh complexes. A whole spectrum of anionic, neutral and cationic complexes may therefore be present in Rh sulfate solutions.

c) SnCl$_2$

As indicated above a large number of Rh complexes may be present in an industrial precious metal mining solution. Because the chloro-complexes of rhodium are relatively inert, and because they often contain water ligands, they are not easily extracted. It has now been found that much more labile and non-aquated complexes of Rh are formed when rhodium chloride complexes are allowed to react with SnCl$_2$ in acidic solutions.

When SnCl$_2$ is added in sufficient quantity, it reduces Rh(III) to Rh(I) which is more labile than the more kinetically inert chloride complexes of Rh due to the strong $\pi$-acid nature of the SnCl$_3^{31}$ ligand. The replacement of SnCl$_3^-$ by another ligand is not subject to such kinetic difficulties as is the replacement of chloride as a ligand. The structure of the Rh(I)-SnCl$_3$ complex is probably that of the simple anion $[Rh(SnCl_3)_5]^{4-}$.

When SnCl$_2$ is not added in significant excess of Rh, then the complexes formed are quite different. An extensive study of the complexes formed by allowing RhCl$_3$3H$_2$O to react with SnCl$_2$ (Rh:Sn molar ratio 1:6 or less) in 3M HCl was performed through $^{119}$Sn NMR spectroscopy. Complexes of the type $[Rh(SnCl_3)_nCl_{6-n}]^{3-}$ (n=1−5 have been identified as well as the Rh(I) complex thought to be $[Rh(SnCl_3)_5]^{4-}$. A possible formation reaction for the Rh(III)-Sn complexes is given below.

$$[RhCl_{6-n}(H_2O)_n]^{n-3} + mSnCl_3^- \longrightarrow [RhCl_{6-m}(SnCl_3)_m]^{3-} + m - nCl^- + nH_2O$$

For the Rh(I) complex, a possible formation reaction may be:

$$RhCl_6^{3-} + 6SnCl_3^- \longrightarrow [Rh(SnCl_3)_5]^{4-} + 3Cl^- + SnCl_6^{2-}$$

The Rh(I) complex is known to be relatively unstable in solution and it may convert back to one of the Rh(III)-Sn-Cl complexes on standing if Sn(II) is not in sufficient excess. However, if excess SnCl$_2$ is present, then the Rh(III)-Cl-Sn complexes will slowly be converted to the Rh(I) species $[Rh(SnCl_3)_5]^{4-}$. It has been found that this Rh(I) species is the most abundant when the Sn:Rh ratio is greater than 4:1. The existence of various complexes helps to explain the change in colour of the aqueous solution from orange to dark purple-red as the Sn:Rh ratio increases.

The exact solution composition for a Rh-Sn-Cl system is quite complex and it depends on a number of factors such as the Rh:Sn ratio, temperature, age of solution and concentration of HCl or Cl$^-$, since the chloride ion concentration will affect the speciation of the Sn(II) chloride complexes from Sn$^{2+}$ to SnCl$_4^{2-}$.

When the Sn:Rh ratio is 6 or less, it has been found that there is no free Sn(II) in solution. In 3M HCl, the reaction between the Rh complexes and SnCl$_3^-$ is complete since no free Sn(II) can be detected in solution until more than the stoichiometric amount of Sn:Rh (6:1 for complete reduction and ligand substitution) has been added. This means that all of the Sn(II) which is added to the Rh solution is immediately used to become either part of the Rh complex or, to reduce Rh(III) to Rh(I).

Although highly charged octahedral complexes are difficult to extract, it might have been expected that the formation of a 4− complex would cause more problems than it would solve. It seems, however, that this complex is much more labile than the Rh(III) chloride complexes and reacts much more readily with various organic extractants. Also, the Rh-Sn-Cl complexes are not aquated so they are not nearly as hydrophillic as the mixed aquo-chloro complexes of Rh(III). The fact that there are only 5 ligands coordinated to the Rh(I) might also explain the apparent high reactivity of this complex since it is possible that Rh wants to complete either the Rh(III) usual octahedral symmetry or the Rh(I) $d^8$ square-planar symmetry and so it quickly reacts with the extractant.

It is also apparent that $[Rh(SnCl_3)_5]^{4-}$ is larger than the Rh(III) aquo-chloro complexes and thus easier to surround with the organic molecules than is the smaller Rh(III)-Cl-H₂O complex.

d) Process Parameters for Complexing or Activation and Extraction

In accordance with the invention it is found that complete activation or complexing of the Rh in chloride ion-containing aqueous solution occurs at a Sn:Rh molar ratio of 2:1.

The activation or complexing takes place even at room temperature, but in such case may take more than 6 hours. At 70° C., 20 minutes is sufficient for the activation.

Extraction of the Rh/Sn complex is found to be generally independent of the HCl concentration of the aqueous solution at least for some extractants.

In general two controls of 10 minutes each will be sufficient for complete extraction of Rh.

Additionally comparison of the extraction results for a fresh solution as compared with an aged solution demonstrates that the effect of aging is negligible.

The chloride ion concentration is also found not to affect the extraction of the Rh/Sn complex, and excess chloride ion does not inhibit the complexing or extraction stages of the method.

These parameters for the method of the invention employing complexing of the Rh with SnCl₂ are to be contrasted with the quite different parameters when no complexing with SnCl₂ is employed.

In the processes which do not employ complexing with SnCl₂, Rh extraction is limited to up to about 30–40%, as compared to 90–100% in the method of the invention. Furthermore, the process without complexing is dependent on both chloride ion concentration and acidity. In particular the % Rh extraction of aqueous solution having a concentration of HCl below 0.7M is markedly lower than that for solutions having a concentration of 0.7 to 2.7M HCl. In addition aging, even of only one day, significantly reduces the amount of Rh extracted. Indeed, for a solution which has undergone aging, the % Rh extracted is so low that it can be considered as nil, since it falls within experimental uncertainty.

Thus the inclusion of SnCl₂ to form a Rh/Sn complex significantly alters the Rh extraction characteristics of the aqueous solution.

If the Rh is to be recovered by stripping, it is preferred to carry out the complexing with an excess of Sn; more especially at a Sn:Rh molar ratio of at least 6:1, preferably at least 10:1, in order to achieve high stripping.

e) Extractants

Suitable organic extractants for the Rh/Sn complex include 8-hydroquinoline derivatives and tri-alkylphosphine oxides, and other basic metal extractants having a nitrogen, oxygen or sulfur atom with a lone pair of electrons, for example, aliphatic or aromatic amines.

The 8-hydroxyquinoline derivatives are of formula (I):

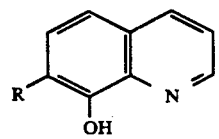

in which R is a saturated or unsaturated, linear or branched aliphatic radical of 8 to 15 carbon atoms.

Specific extractants of formula (I) include Kelex 100 (Trade Mark) in which R is a saturated radical of 11 carbon atoms, TN 1911 (Supplier's designation) in which R is an unsaturated branched radical of 10 to 13 carbon atoms and TN 2181 (Supplier's designation) in which R is an unsaturated branched radical of 10 to 13 carbon atoms, LIX 26 (Trade Mark) in which R is an unsaturated branched radical of 10 to 13 carbon atoms.

The trialkyl phosphine oxides are of formula (II):

in which each R is a straight chain or branched alkyl of 6 to 8 carbon atoms; preferred phosphine oxides are those in which R is n-hexyl or n-octyl.

The organic extractant is suitably diluted with an organic vehicle or diluent, for example, Solvesso 150 (Trade Name) which has an aromatic content of about 97%, and may conveniently include a modifier, for example, tridecanol, which functions as a surfactant to assist phase separation.

Suitably the organic extractant is employed in organic solution to a concentration of 0.5 to 30 vol. % extractant, preferably about 1 to 15 vol. % extractant. A particular concentration level of the organic extractant within such ranges is readily determined for a particular case, having regard to the Rh concentration in the aqueous solution. The aqueous solution containing the Rh complex and the organic extractant phase are suitably contacted at a volume ratio of 1:2 to 10:1, preferably 1:1 to 3:1.

Suitably the organic solution is subjected to a preconditioning stage to remove acid soluble compounds. This may be achieved by contacting the organic solution with HCl, for example, an equal volume of 3M HCl for about three minutes, to wash out the acid soluble organic compounds; whereafter the acidified organic solution is washed with distilled water, for example, four three minute washings with distilled water, to remove the acid and acid soluble compounds.

f) Recovery of Rh

The rhodium can be recovered from the Rh loaded organic phase by different recovery techniques including burning off the organic; reduction of the Rh complex directly from the organic phase with a reducing agent such as formic acid, oxalic acid or hydrogen gas; or by stripping Rh from the organic phase with a stripping agent and isolating Rh from the Rh-loaded stripping agent.

Although burning off the organic may be considered to have disadvantages, not least being the destruction of the organic solvent, the high value of rhodium makes even this recovery process economically feasible.

The recovery by reduction of the Rh complex may suitably be carried out by heating the organic phase containing complex at a temperature of 25° C. to 200° C., preferably about 100° C., at a pressure of 1 to 20 atmospheres for up to 4 hours in an autoclave. Suitably the reduction is preceded by a scrubbing step to remove impurities and a step for recovery of tin.

The scrubbing step is suitably carried out by multiple contacts of the Rh-loaded organic phase with 0.5 to 8M hydrochloric acid, especially 2M hydrochloric acid. The scrubbing step with hydrochloric acid removes impurities such as Cu, Fe, Zn, Bi, Sb, Se Te and Ag, but does not remove Sn.

The tin recovery step can be carried out by stripping the tin from the organic phase with 0.75 to 1.5M caustic soda.

The scrubbing step and the tin recovery step can both be carried out by contacting the organic phase with the hydrochloric acid scrubbing solution or caustic soda tin recovery solution in sequential mode.

Recovery of the Rh by stripping of the Rh from the Rh loaded organic phase containing the extractant is achieved with a stripping reagent. The most suitable stripping reagent is found to be aqueous sulfuric acid.

The stripping is usually carried out by contacting the Rh loaded organic phase with sulfuric acid a plurality of times, each for a relatively short contact time. Suitably the sulfuric acid has a concentration of 1 to 2.5M and four or five contacts with the Rh loaded organic phase are carried out, each of about 5 minutes duration.

Surprisingly it is observed that no stripping of Rh occurs during the first contact. It is believed that the first contact with the sulfuric acid stripping agent removes chloride ion coextracted with the Rh-extractant complex, by replacing the chloride ion in the organic extractant complex with bisulfate or sulfate ion.

Probably, when chloride ion is completely removed some form of $Rh/SO_4$ complex forms which is not extractable with the extractant and is thus readily stripped by the sulfuric acid stripping agent. The sulfuric acid stripping agent should be free of chloride ion.

Nitric acid appears to be a weak stripping agent permitting recovery of up to only 20%, by weight, of the Rh in the organic phase; and hydrochloric acid does not strip Rh at all. Ferric chloride solution and tartaric acid provide a generally low recovery of Rh from the organic phase.

Sulfate salt solutions such as magnesium sulfate solution proved incapable of stripping the Rh loaded organic phase, and as indicated other acids produced only poor results or no stripping at all. It would appear that both hydrogen ions and sulfate ions are required to achieve a satisfactory level of stripping from the Rh loaded organic phase.

Surprisingly it is found that the inclusion of a soluble sulfate salt of a Group I or II metal of the Periodic Table, for example, Na, Mg or K, especially sodium sulfate, in the aqueous sulfuric acid provides a significant increase in the degree of stripping and requires fewer contacts between the stripping solution and the Rh-loaded organic phase. The sulfate salt is employed in an amount up to saturation level, in the sulphuric acid and suitably in a concentration of 0.5 to 2.0M.

The contact time for each stripping stage is suitably 3 to 20 minutes and typically is about 5 minutes. The stripping can also be carried out employing a flow of the Rh-loaded organic phase and bringing the flow into contact with a counterflow of the stripping agent.

g) Stripping of Sn

The Sn is co-extracted with the Rh and it is found that there is a direct relationship between the Sn and Rh stripping wherein 2 moles of Sn are stripped for each mole of Rh stripped. On the other hand, efficient stripping requires an Sn:Rh molar ratio of at least 6:1, preferably at least 10:1 in the organic phase. It would appear that the excess Sn in the organic phase is extracted into that phase as free Sn not complexed with Rh, and that the free Sn is not stripped with sulfuric acid.

Since only about 25-30% of the Sn load of the organic phase is stripped by the sulfuric acid stripping agent, it is necessary to remove the excess Sn from the organic phase in order that the latter can be recycled for use in the extraction stage. This is achieved by stripping the Sn from the organic phase with caustic soda, suitably at concentrations of 0.5 to 2.0M, preferably about 1.0M. In particular 1M NaOH strips more than 90% of Sn(II) and 65% of Sn(III) in two five minute contacts; furthermore, more than 90% of Sn(II) can be stripped with 1M NaOH in a single contact of about 60 minutes.

It is found that the stripping of the free Sn with NaOH should be carried out after the stripping of the Rh, rather than before. If the stripping of Sn with the NaOH is carried out before the Rh stripping, the Rh loaded solution becomes immune to the sulfuric acid stripping solution.

BRIEF DESCRIPTION OF DRAWINGS

FIG. a typical Prior Art Precious Metals Refining Flow Sheet;

FIG. 2 is a Prior Art Rhodium Recovery Flow Sheet;

FIGS. 28 to 32 are flow sheets illustrating Rh recovery schemes of the invention.

EXAMPLE 1 (Comparison)

In this Example the extraction behaviour of Rh(III) with 8-hydroxyquinoline extractants was studied. A number of different parameters affecting the extraction of Rh(III) with extractants R-HQ were investigated and these include the effect of acidity, total $Cl^-$ concentration, age of solution, temperature of aging, $SO_4^{2-}$ presence and concentration and contact time.

Tests were performed with extractants of formula (I) identified above, particularly TN 1911 and TN 2181 described hereinbefore.

Because the solutions were prepared using $Na_3RhCl_6 \cdot XH_2O$, the extraction was often tested for both freshly prepared solutions and solutions which were allowed to age 72-96 hours since $RhCl_6^{3-}$ undergoes aquation rather easily and the amount of $RhCl_6^{3-}$ in a freshly prepared solution will decrease until it reaches equilibrium. By freshly prepared solutions, it is meant solutions which were not normally allowed to age for more than 5 to 10 minutes prior to contact with the organic.

a) Effect of Feed Acidity in the High Acid Region (0.7 to 8M HCl)

Figure 3:
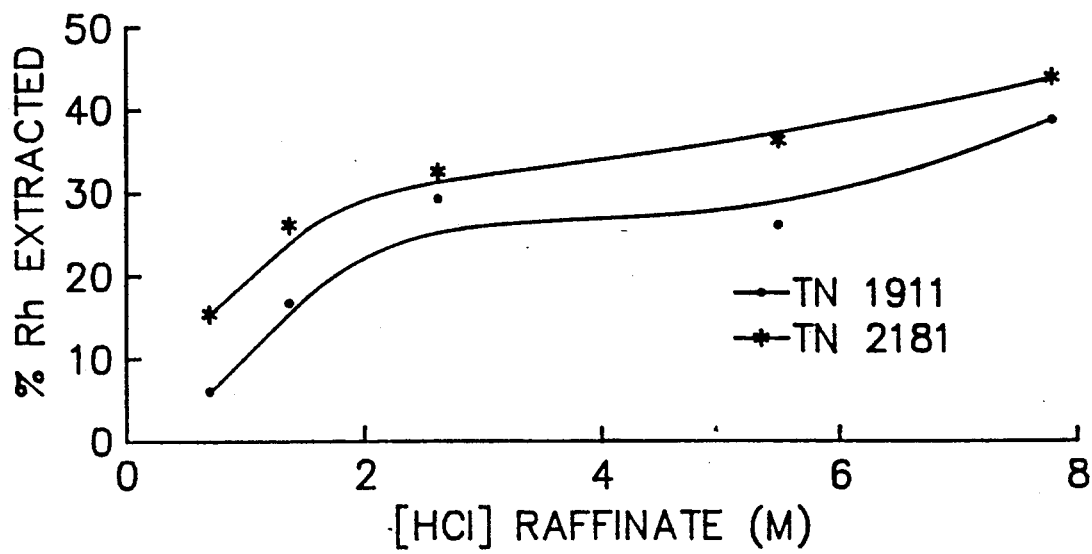
FIG. 3 is a plot of Rh extraction at different acidity levels with fresh extraction solutions.

The effect of the feed solution acidity on the amount of Rh(III) extraction was investigated in the region 0.7 to 8.3M HCl (about 26 g/L to 300 g/L). FIG. 3 depicts the % extraction of Rh as a function of HCl concentration in the raffinate for both TN extractants contacted with freshly prepared Rh feeds at the following process parameters: 600 ppm Rh feed, 10 minutes contact, A/O (aqueous/organic) ratio of 1, 2 vol. % extractant. The effect of the feed acidity was also tested for solutions which were allowed to age at room temperature for a period of three days and the results are presented in FIG. 4 at the following process parameter: 600 ppm Rh feed, 10 minutes contact, A/O=1. On the same FIG., the theoretical abundance of the $RhCl_6^{3-}$ is included. This abundance is the % Rh present in solution as $RhCl_6^{3-}$. According to rate constants for the aquation/anation of $RhCl_6^{3-}/-RhCl_5(H_2O)^{2-}$, the feeds should have reached equilibrium after much less than three days.

Figure 4:
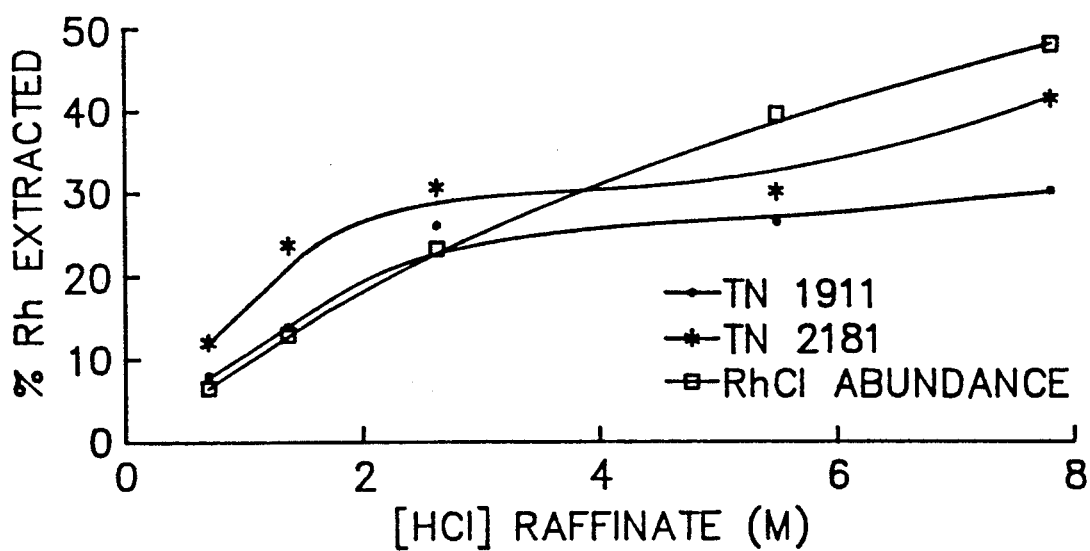
FIG. 4 is a plot similar to FIG. 3 but for 3-day aged solution.

For the results shown in FIGS. 3 and 4, it can be observed that, generally, for both a fresh and an aged solution, the % Rh extracted increases with increasing acidity. This can be explained due to the fact that if the extraction mechanism is ion-pair formation, then an increase in acidity should help to increase the extraction degree since the extractant would become protonated more and more easily and extensively.

Another reason for the increase in extraction degree with increasing HCl concentration in the feed may be that the overall abundance of $RhCl_6^{3-}$ increases due to the increase in total $Cl^-$ concentration arising from the HCl.

The non-agreement between the abundance and the extraction degree of Rh at high acidities may be explained by considering the overall extraction equilibria/reactions.

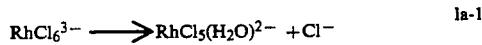

$$RhCl_6^{3-} \longrightarrow RhCl_5(H_2O)^{2-} + Cl^- \qquad \text{1a-1}$$

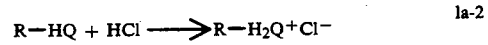

$$R-HQ + HCl \longrightarrow R-H_2Q^+Cl^- \qquad \text{1a-2}$$

$$RhCl_6^{3-} + 3R-H_2Q^+Cl^- \longrightarrow RhCl_6 \cdot (R-H_2Q)_3 + 3Cl^{3l}$$

It is possible that at acidity levels of 5.5 and 8.2M HCl (about 200 to 300 g/L HCl), the total chloride ion concentration is high enough to push reaction 1a-1 to the left but to hinder the complete progression of reaction 1a3 due to the large number of chloride ions given off in the latter reaction.

Although no very great variation in % extraction between the two extractants is observed, it can still be concluded that TN 2181 extracts marginally more Rh(III) than TN 1911. The slight superiority of TN 2181 over TN 1911 as an extractant for Rh may possibly be explained by the lower steric hindrance of TN 2181 and therefore, the greater ease of approaching three TN 2181 molecules around $RhCl_6^{3-}$.

b) Reproducibility of Results

In order to determine how reproducible the results are, the Rh extraction test at 0.7 to 8.0M HCl with 2 volume % TN 2181 (about $1.3 \times 10^{-2}M$) was performed twice; the tests being performed on different days and with different Rh feed solutions.

It was found that the trend is comparable for both experiments but that variations do occur. In general, a difference of 5% in % Rh extracted exists between the two trials. A 5% difference was therefore chosen as being representative of the experimental uncertainty for all Rh extraction results.

c) Effect of Addition of Cl salt in the Region 0.7 to 2.7M HCl

Figure 6:
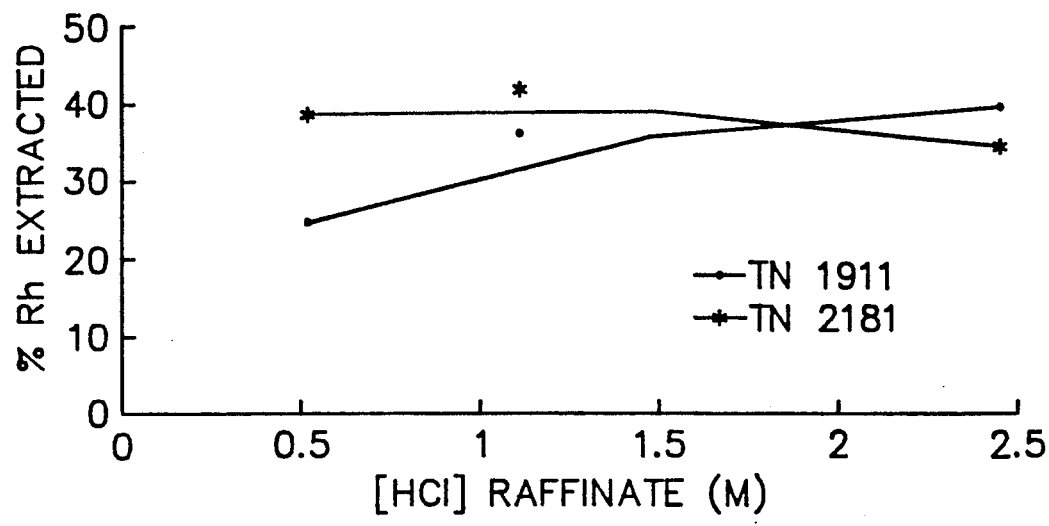
FIG. 6 is a plot of Rh extraction for fresh solution at different acidity levels at constant chloride ion concentration.
Figure 7:
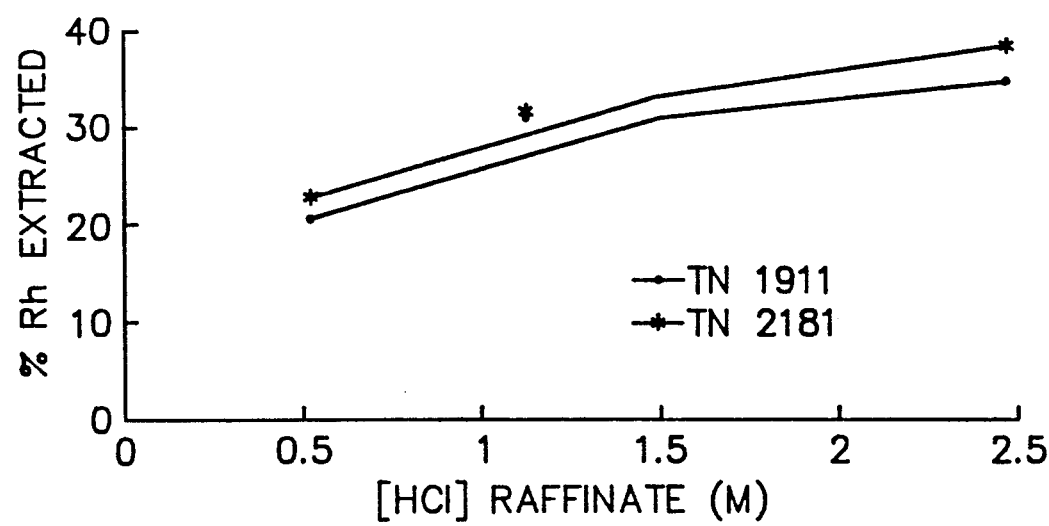
FIG. 7 is a plot similar to FIG. 6 for 3-day aged solutions.

Industrial feed solutions contain significant amounts of chloride salts in addition to HCl. Thus, the effect of chloride ion concentration was investigated in a series of tests in which $MgCl_2$ was added to feed solutions of different acidities so as to ensure that the feeds contained a total of about 4M Cl (considering both $MgCl_2$ and HCl). The results obtained are shown in FIGS. 6 and 7 for a fresh and a three day aged solution, respectively, at the following process parameters: 500 ppm Rh, 10 minutes contact, A/O=1. Overall, TN 2181 gives once more superior extraction levels.

At 4M Cl$^-$ the abundance of RhCl$_6^{3-}$ at equilibrium should be about 32%. Assuming that all solutions contained Cl$^-$ in the range of 3.5 to 4.5M, then the RhCl$_6^{3-}$ abundance should vary from about 28 to 35%. This corresponds quite well to the % extraction obtained for the 3 day aged solutions which should indeed have reached equilibrium.

Once again, it can generally be concluded that an increase in acidity increases the Rh extraction degree for both fresh and aged solutions even when the total Cl$^-$ ion concentration is constant at about 4M. It is therefore clear that total chloride concentration is not the only parameter which governs the amount of Rh extracted but that the feed acidity is also important since for the ion-pair formation extraction mechanism, the acidity level is also of great importance. For example, the Rh extraction degree for an aged solution at 0.7M HCl is lower than the expected abundance of RhCl$_6^{3-}$. It is possible that at this acidity level, the extractant is not protonated to a sufficiently high degree to completely extract all of the available RhCl$_6^{3-}$.

Figure 8:
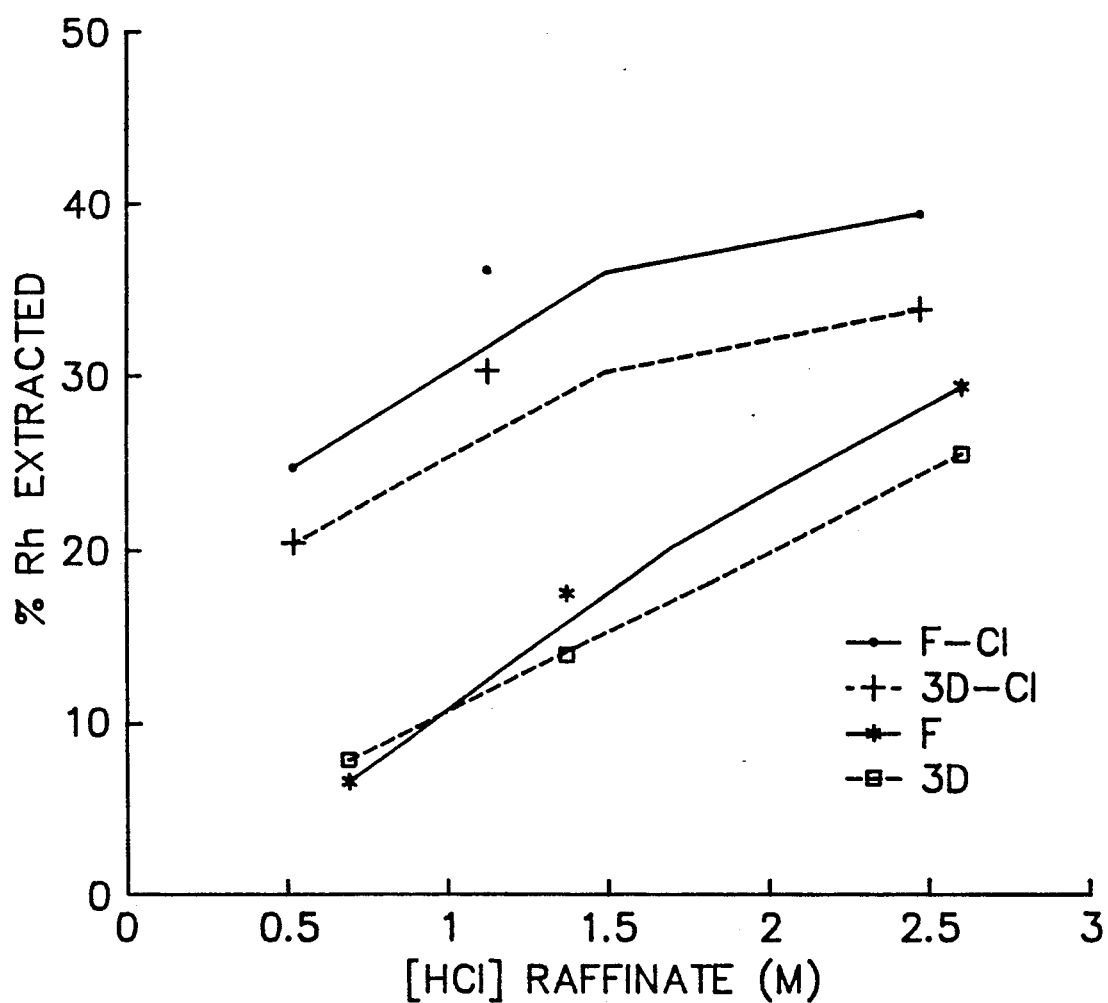
FIG. 8 is a plot of combined effect of chloride ion concentration and HCl concentration on Rh extraction for fresh and 3-day aged solutions.

A comparison of the extent of extraction when a Cl salt is added (to maintain about 4M Cl) with solutions having only the chloride level from HCl was carried out. FIG. 8 shows the curves obtained for Rh extraction with TN 1911, at the following process parameters: 600 ppm Rh, 10 minutes contact, A/O=1, for fresh and 3 day aged solutions. As expected, the addition of a Cl salt to the Rh feeds has the effect of increasing the % Rh extraction for both a fresh and an aged solution. The increase, which varies anywhere from about 10-20% is most likely due to the increase in the overall abundance of RhCl$_6^{3-}$.

It is also seen that the increase is highest for the feeds at the lower acidity, 0.7 and 1.4M HCl. Since these solutions contain little initial Cl$^-$ compared to the 2.7M HCl feed, the increase to 4M total chloride is quite significant.

Figure 9:
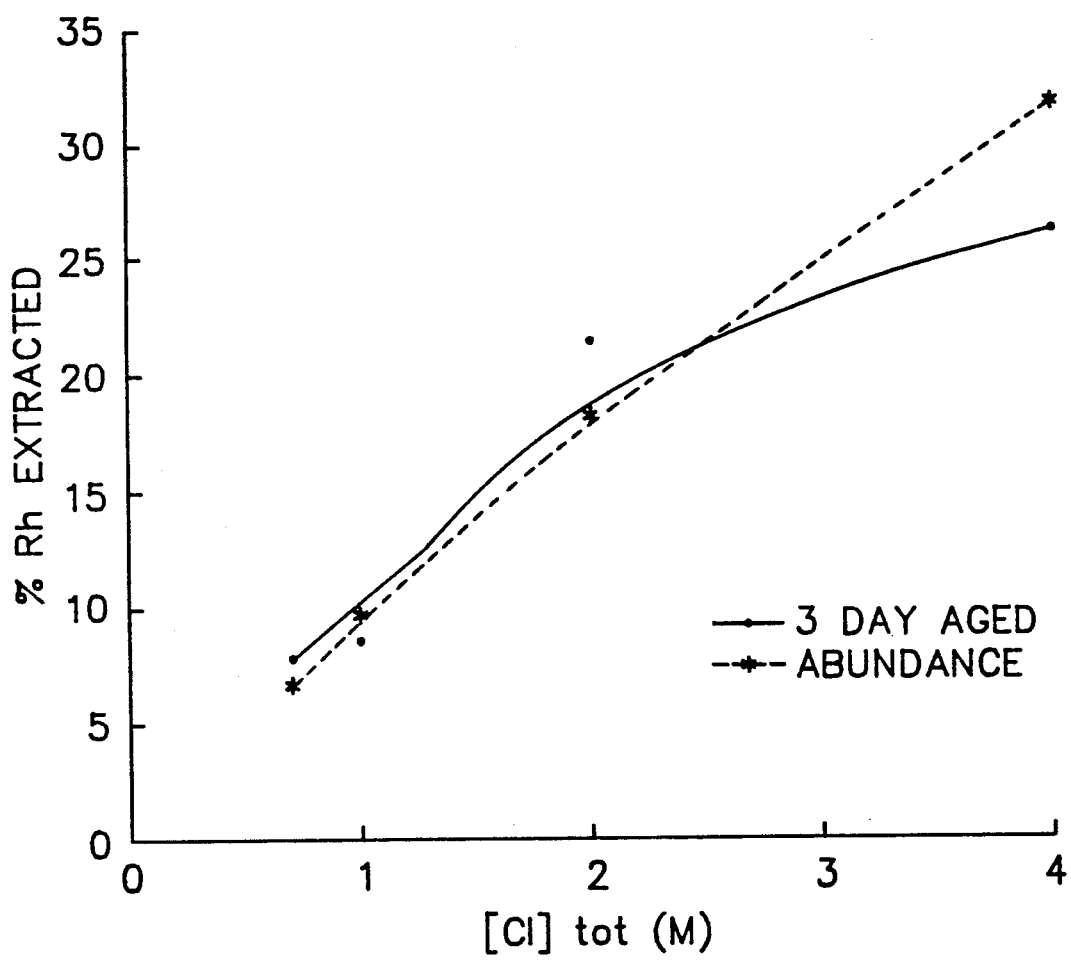
FIG. 9 is a plot of Rh extraction at different total chloride ion concentrations.

The effect of the total chloride concentration was studied further by analyzing the degree of Rh extraction from solutions containing 0.7M HCl but different amounts of total chloride ion concentration achieved through the additions of MgCl$_2$ or CaCl$_2$. The results obtained for a three day aged feed are represented in FIG. 9 for the following process parameters: 400 ppm Rh, 0.7M HCl, CaCl$_2$ or MgCl$_2$, 10 minutes contact, TN 1911. Indeed, the total Cl$^-$ concentration does seem to have a direct influence on the amount of Rh extracted. The extraction degree compares well with the theoretical RhCl$_6^{3-}$ abundance as shown in FIG. 9.

d) Effect of Contact Time

Figure 10:
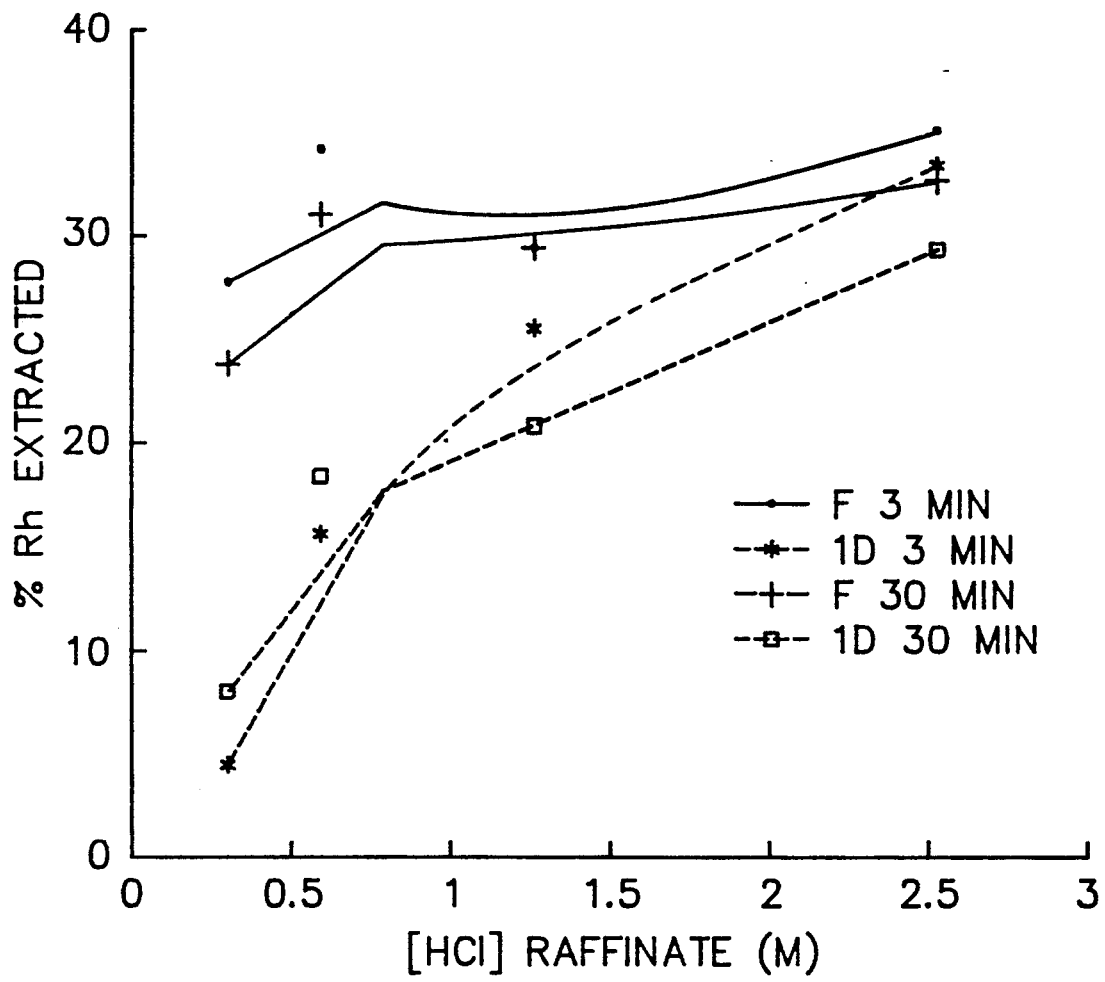
FIG. 10 is a plot showing effect of contact time on Rh extraction.

One of the initial tests performed was the determination of the effect of contact time (CT) on the extraction of Rh and as shown in FIG. 10, at the following process parameters: 400 ppm Rh, TN 1911, 4M Cl, A/O=1 contact time does not have a large effect. Contact times of 3 to 30 minutes are compared and although deviations do occur, the % extraction usually falls within the 5% experimental error determined earlier. For this reason, a standard contact time of 10 minutes was used for most of the experiments.

e) Rh Extraction in the Low Acid Region (pH=0.5 to 3.5)

It is clearly apparent from the results presented above that Rh(III) extraction (though limited to about 30–40%) tends to increase with both chloride ion concentration and acidity. To investigate further the effect of acidity, the extraction of Rh(III) was studied in the lower acid region (pH 0.5 to 3.5 when [Cl−] was kept constant at 4M).

Figure 11:
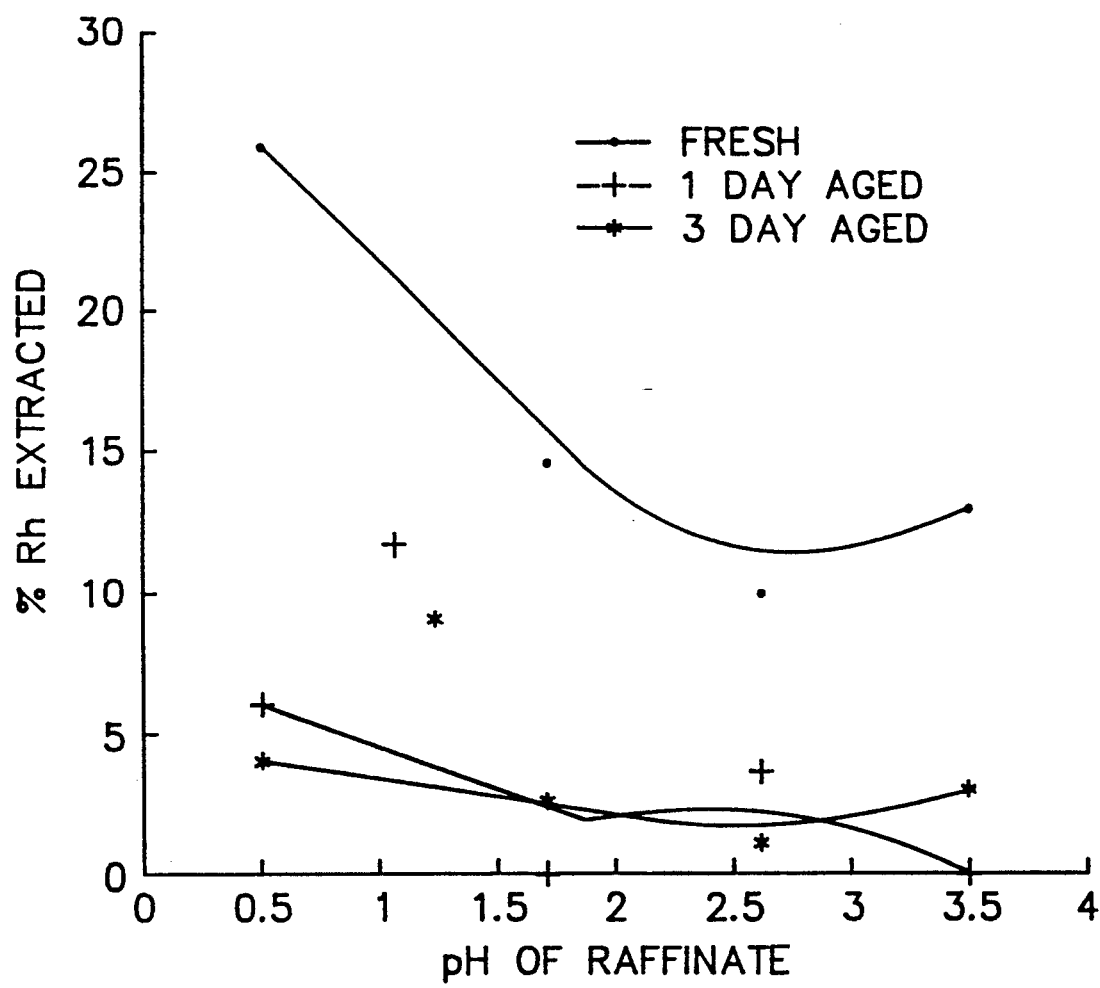
FIG. 11 is a plot of Rh extraction in the low acid region.

As can be observed in FIG. 11, the % Rh extraction in the low acid region is quite suppressed when compared to that obtained in the 0.7-2.7M HCl region. Also, aging (even only one day) has a sharp effect on the amount of Rh extracted. In most cases, for a solution which has undergone any aging, the % Rh extracted is so low that it can be considered as nil since it falls within the experimental uncertainty certainty. In FIG. 11 the process parameters were: 400 ppm Rh, TN 1911, 15 minutes contact, A/O=1.

The difference in extraction degree between the fresh and aged solutions may possibly be explained by the formation of other than simple aquo-chlorocomplexes, such as polynuclear complexes or even partially hydrolyzed species. The latter are known to be the dominant Rh(III) complexes at pH>2.9 and it is thus possible that some amount is formed below this pH level. The formation of either hydrolyzed or polynuclear species would have an effect on the abundance of both RhCl$_6^{3-}$ and RHCl$_5-$ (H$_2$O)$^{2-}$ and ultimately on the degree of extraction as it is witnessed in FIG. 11.

A solution which contains 4M Cl should contain about 30% RhCl$_6^{3-}$ and as the extraction is much lower than 30% (even for fresh solutions), it seems that in the very low acid region the degree of extraction is not limited by the amount of RhCl$_6^{3-}$ present but rather by the solution acidity which controls the protonation of the extractant.

Thus assuming always that the extraction mechanism is ion-pair formation, then the decrease in [H+] leads to a decrease in extraction since it becomes more and more difficult for the extractant to protonate and become positively charged. The non-extraction of Rh from very low acid feeds is another indication that the mechanism of extraction RhCl$_6^{3-}$ is ion-pair formation.

Figure 12:
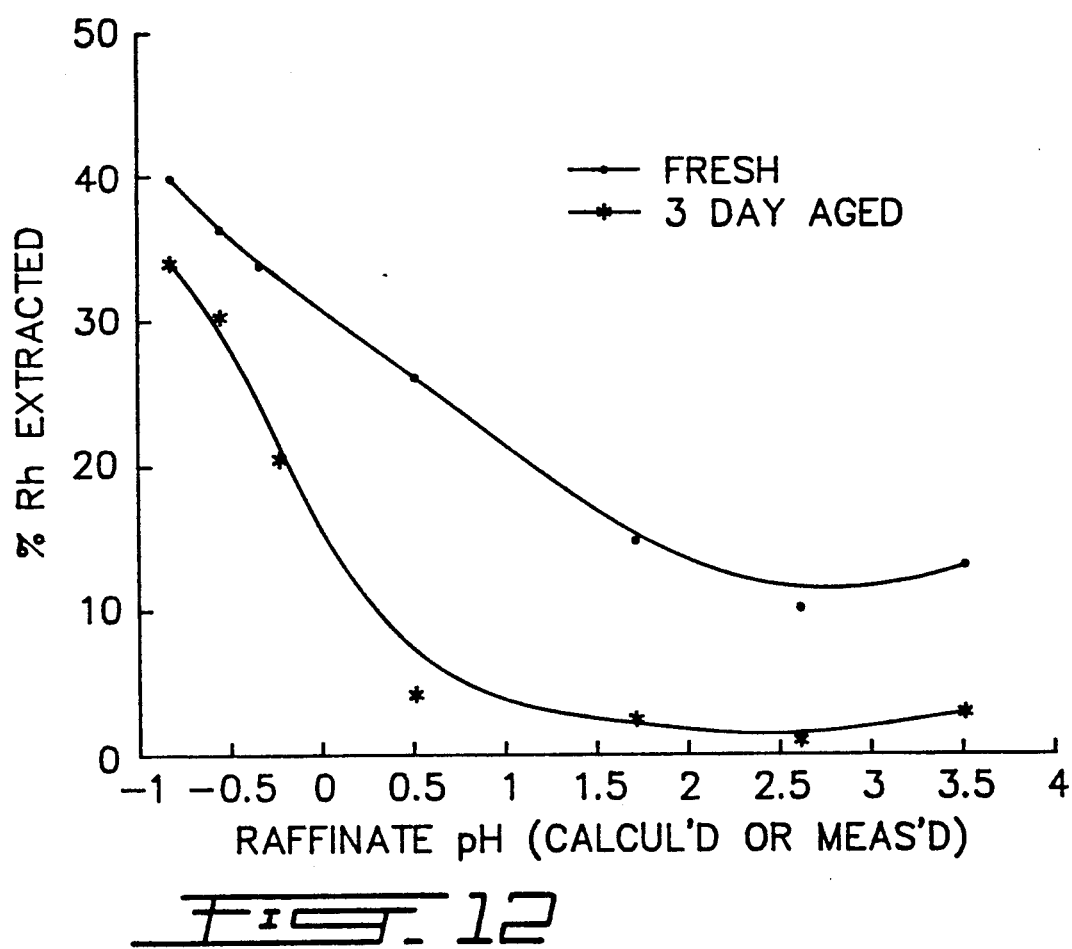
FIG. 12 is a plot of Rh extraction in the full acid region.

The results of FIGS. 6, 7 and 11 were grouped in a single graph (FIG. 12) by converting HCl concentrations to the pH scale at the following parameters: acid region 2.7M HCl to pH 3.5, 400 ppm Rh, TN 1911, 15 minutes contact, A/O=1. For estimating the proton activity of the HCl solutions, Jansz's methodology was followed for 0.3 to 2.7M HCl feeds. The acidity effect is clearly apparent in FIG. 12 as is the fact that aged solutions are not extracted to the same extent as fresh solutions.

f) Effect of Aging

Figure 13:
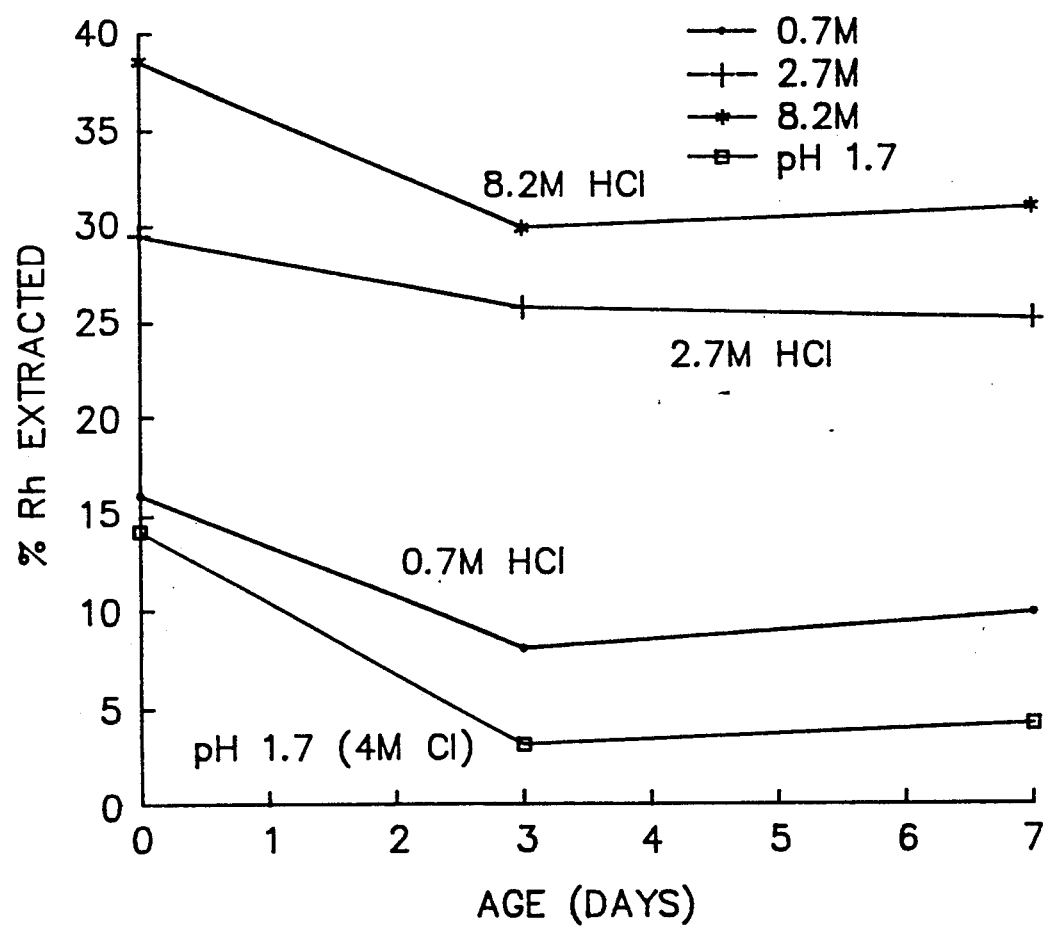
FIG. 13 is a plot of Rh extraction for solutions of different aging and HCl concentration.

It is expected that as solutions age, the extraction degree will drop until the solutions attain equilibrium due to the continuing aquation of RhCl$_6^{3-}$. It has already been shown that aging has a lowering effect on Rh extraction. This is further illustrated with FIG. 13 at the following process parameters: 500 ppm Rh, TN 1911, 10 minutes contact. FIG. 13 is particularly interesting in that it shows both the aging and the acid effect. Clearly, the highest extraction is obtained for a fresh, very acid solution. Also, with aging, the extraction degree drops slowly for the high acid solutions ([HCl]>0.7M) but comes to almost zero in the low acid region. Also, it is clear that there is very little change in extraction degree between the 3 and 7 day aged solutions which is as expected since by 3 days, the solutions should have reached equilibrium.

During the industrial processing of the PGM solutions, the solutions are sometimes heated for a certain period of time.

Figure 14:
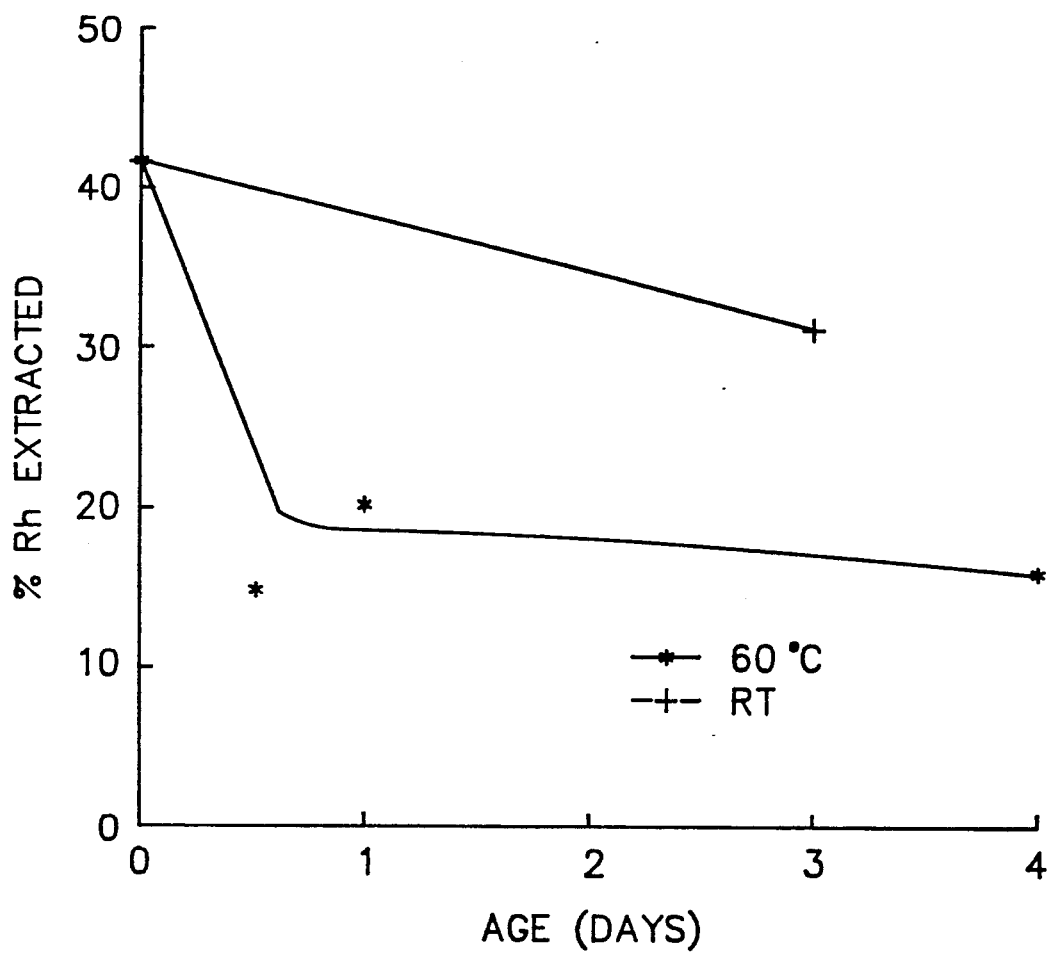
FIG. 14 is a plot of Rh extraction with aging at 60° C.

It is known that the temperature of the solution has a positive effect on Rh's rate of equation. It is therefore expected that the abundance of $RhCl_6^{3-}$ should be lowered with increasing temperature. A Rh solution was heated to 60° and the extraction degree was tested at various intervals once the samples had been allowed to cool to room temperature. The results obtained are shown in FIG. 14 at the following process parameters: 400 ppm Rh, 1.4M HCl, TN 2181, 10 minutes contact. As expected, the extraction degree is lower for solutions which are heated prior to extraction. This is another indication that the Rh species which is extracted is probably $RhCl_6^{3-}$.

g) Effect of the Presence of Sulfate

Figure 15:
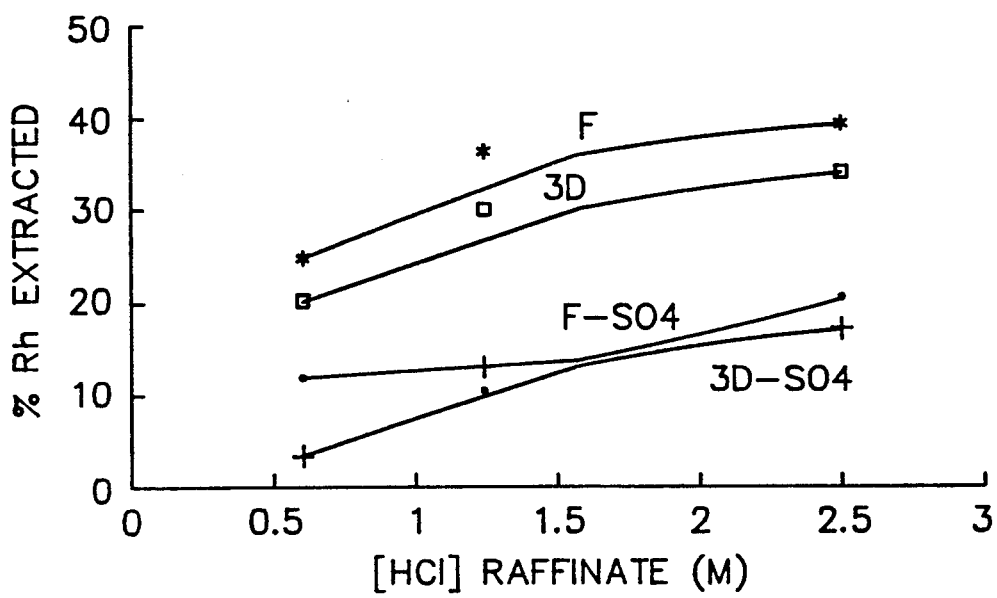
FIG. 15 is a plot of Rh extraction with and without sulfate ion.

Because the feed solutions sometimes contain significant amounts of sulfate, it is important to determine if $SO_4^{2-}$ or $HSO_4^-$ has any effect on the extraction of Rh. Aqueous solutions containing both 4M $Cl^-$ and 1M $Na_2SO_4$ were prepared and the extraction results were compared to those obtained from solutions containing only 4M $Cl^-$. The results, presented in FIG. 15, for the following process parameters: 400 ppm. Rh, TN 1911, 10 minutes, contact, A/O=1 show that for both fresh and 3 day aged aqueous solutions, the % extraction decreases significantly in the presence of $SO_4^{2-}$. The trend of increased extraction with increasing acidity appears to remain.

Figure 16:
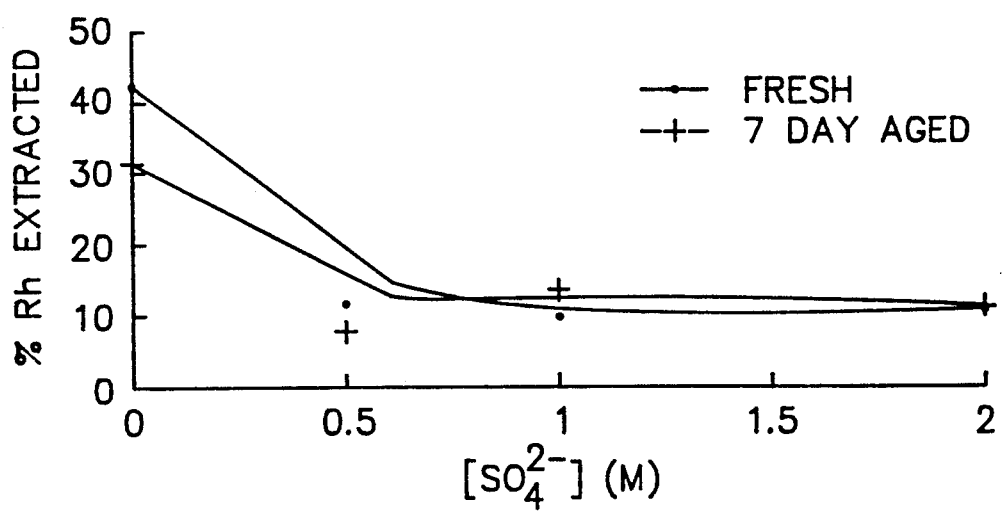
FIG. 16 is a plot showing effect of sulfate concentrations on Rh extraction.

Experiments were carried out to determine if the overall $SO_4^{2-}$ concentration had an effect on the % extraction of Rh. Solutions of 0 to 2M $SO_4^{2-}$ at 1.4M HCl and 4M Cl were prepared and the extraction degree was determined. The results obtained for both fresh and aged solutions can be found in FIG. 16 for the following process parameters: 500 ppm Rh, TN 2182, 4M Cl, 10 minutes contact. The results show that a concentration of 0.5M $SO_4^{2-}$ is enough to significantly suppress the extraction of Rh and that a higher concentration does not lead to a further decrease in overall extraction.

Example 2

In this example the aqueous Rh-containing solution was modified by inclusion of stannous chloride having regard to the teachings of the invention.

a) Effect of Feed Acidity in the Action Region 0.7 to 8M HCl

Figure 17:
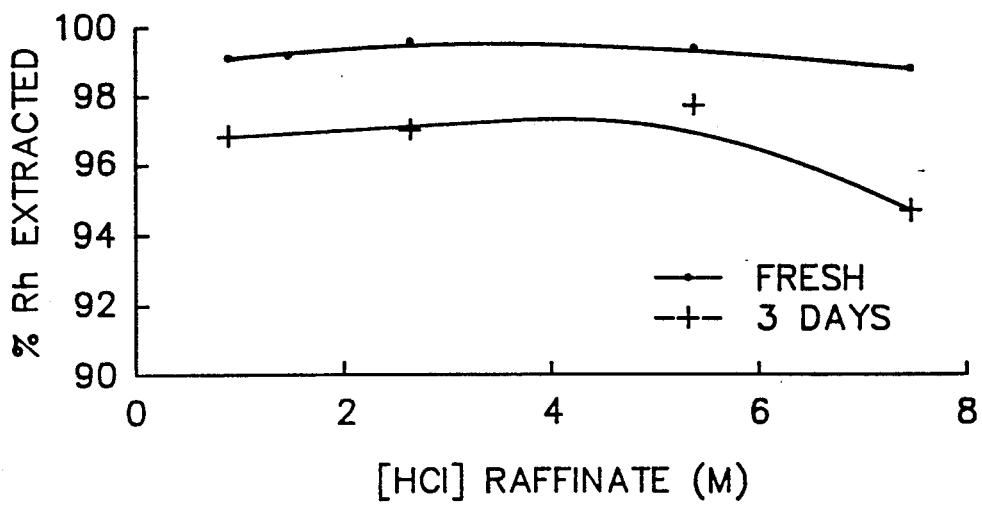
FIG. 17 is a plot showing Rh extraction in the presence of stannous chloride.
Figure 18:
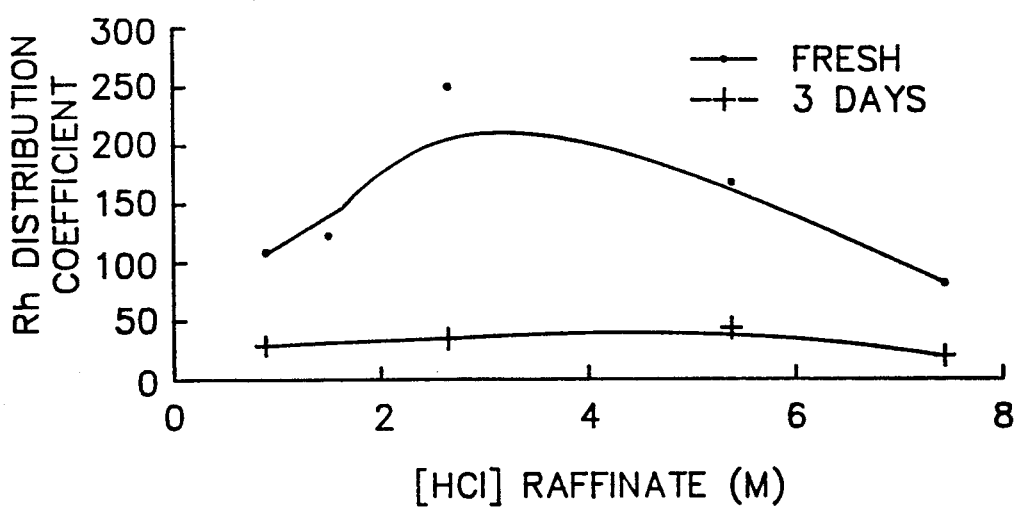
FIG. 18 is a plot of Rh distribution coefficient in the presence of stannous chloride.

A series of Rh(III) aqueous solutions containing about 400 ppm ($4 \times 10^{-3}$M) Rh and ranging in acidity from 0.7 to 8.2M HCl were treated with 0.1M $SnCl_2$ and the extraction degree of Rh with extractant was determined. The results, presented in FIG. 17, for the following process parameters: 2 vol. % TN 2181, 0.1M Sn, A/O=1, 10 minutes contact show very strong extraction of Rh independent of the HCl concentration in the feed. Replotting the same data in the form of D versus HCl concentration (FIG. 18) shows very high distribution coefficient values exceeding 100 for the fresh solution. In FIG. 18 the process parameters were as follows: 2 vol. % TN 2181, 0.1M Sn, A/O=1, 10 minutes contact.

Comparison of the results for a fresh solution versus a 3 day aged solution show that the effect of aging is negligible. The small decrease in extraction degree (about 2%) observed is more likely due to the aqueous feed solution preparation than to a real decrease in extractability. This is because, from visual observation, it seems that the degree of completion of the reaction between Rh(III) and Sn(II) is dependant on temperature and on the overall time of reaction. It is possible that the solution was not heated or allowed to react for a long enough period of time and therefore, the Rh(III) was not completely converted to the extractable form.

Aging in this system is not as important as in the Sn-free system because apparently all of the Rh-Cl complexes undergo a reaction with Sn(II). Thus the relative amount of $RhCl_6^{3-}$ in the feed solution is no longer important in determining the percentage of Rh extracted.

Figure 19:
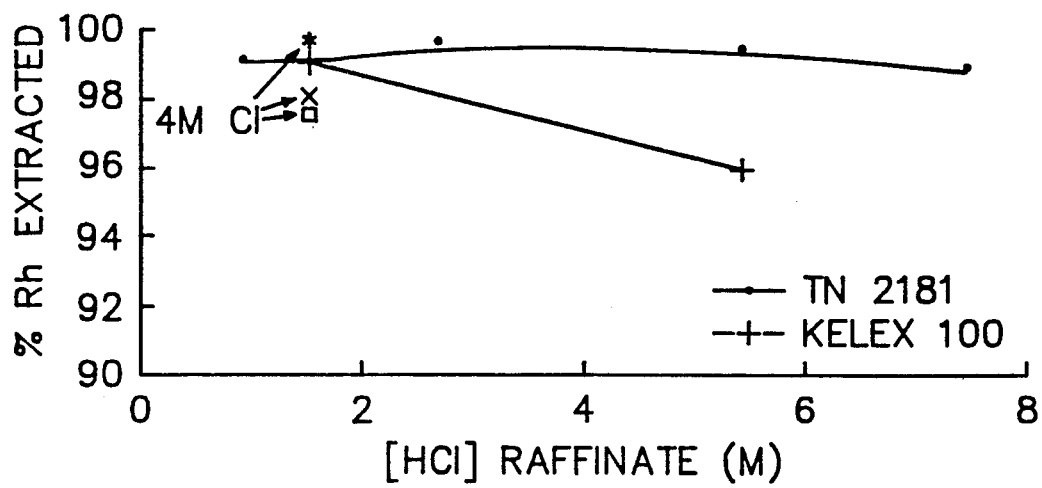
FIG. 19 is a plot similar to FIG. 17.

In addition to TN 2181, Kelex 100, both members of the 7-alkylated 8-hydroxyquinoline derivatives family, were tested as a potential extractant for the Rh-Sn-Cl system. Two acidity levels were investigated, namely 1.4 and 5.5M HCl. Similarly to the TN 2181 results, the extraction degree was very high at both acidity levels as shown in FIG. 19 at the following process parameters: 0.1M Sn for TN and 0.5M Sn for Kelex, A/O=1, 10 minutes contact, 250 ppm Rh feed.

Figure 5:
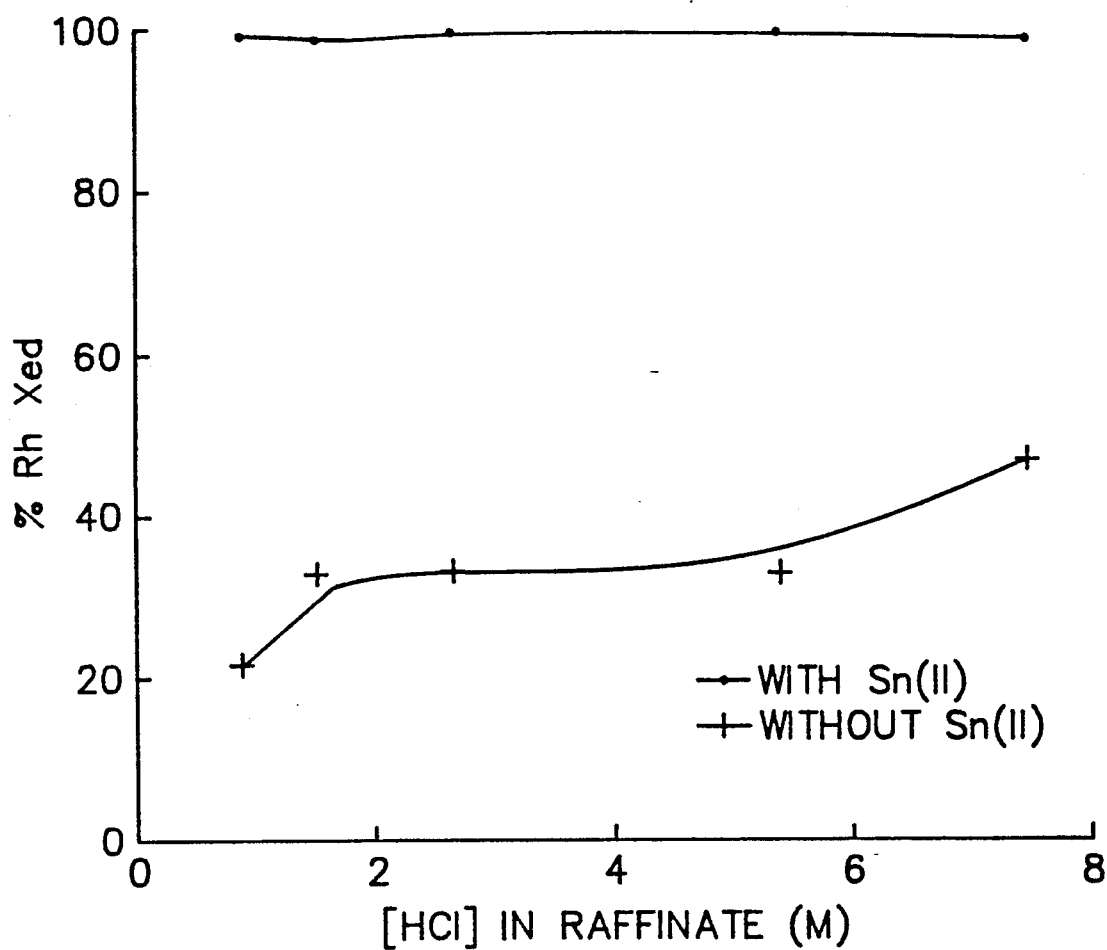
FIG. 5 is a plot comparing % Rh extraction with and without use of $Sn^{2+}$.

The effect of $Cl^-$ ion addition on the extraction of Rh from the Rh-Sn-Cl system was also investigated with both reagents (TN 2181 and Kelex 100) at 1.4M HCl. In all of these tests the total chloride concentration was maintained at about 4M (i.e., 1.4M coming from HCl and 2.6M from $MgCl_2$) in order to ascertain that the presence of extra chloride would not inhibit either the Rh-Sn reaction or the extraction from occurring. Once again, the extraction degree was very high for both organic extractants. (See data points on FIG. 19.) It can be seen that prior treatment of the solutions with $SnCl_2$ permits substantially complete extraction of Rh. The dramatic improvement in Rh extraction in the presence of Sn(II) is illustrated in FIG. 5 having the process parameters: 4M Cl, 10 minutes contact.

b) Sn Co-Extraction

Ideally, it would be preferable if the Sn which is added to the aqueous feed to render the Rh more "reactive" was not or was very slightly co-extracted with the Rh. In practice, this is not the case as 8-hydroxyquinolines are very good extractants for both Sn(II) and Sn(IV). In general, the extraction degree of Sn(II) using either TN 2181 or Kelex 100 ranged from 65 to 80% extraction. Since the amount of Sn in the feed was much higher than that of Rh (generally, $5 \times 10^{-2}$M Sn versus $4 \times 10^{-3}$M Rh), the Sn in the organic represents a large excess over the Rh.

Stripping of Rh from Loaded 8-Hydroxyquinoline

Having determined that it is possible to extract Rh from this type of aqueous solution, it was then important to devise a technique by which to strip the Rh from the loaded organic. A number of different stripping reagents were tested and these are listed in Table 2 along with an average value of the stripping results obtained.

TABLE 2

Summary of Exploratory Stripping Tests (Loaded 2 volume % organic with aqueous feed of 400 ppm Rh (4 × 10⁻³M), 4M Cl⁻, 0.05M Sn²⁺ at 1.4M HCl)

| STRIPPING AGENT | % STRIPPING | |
|---|---|---|
| | TN 2181 | KELEX 100 |
| Salts | | |
| 0.5M $FeCl_3$ | 5 | |
| 0.2M $Fe_2(SO_4)_3$ | 0 | |
| 0.4M $NH_4Cl$ | 0 | |
| 2M $MgSO_4$ (pH 0.6) | | 0 |
| Acids | | |
| 8.2M HCl | | 0 |
| 5.6M $HNO_3$ (1 contact) | 17 | 16 |
| (3 contacts) | 20 | |
| 1.7M $HNO_3$ | | 0 |
| (5 contacts) | | |
| 3.0M $H_2SO_4$ (2 contacts) | | 35 |
| 1.7M (3 contacts) | | 74 |
| | | 71 |
| 1.7M + 1M $SO_4^{2-}$ | 14 | 85–100 |
| (5 contacts) | | |
| 1.1M (5 contacts) | | 77 |
| 2.3M (5 contacts) | | 80 |
| Special | | |
| 1M Tartaric acid | 5 | |
| 0.05M EDTA | 0 | |
| Water | 3rd phase formation/ precipitation | 3rd phase formation/ precipitation |

Figure 20:
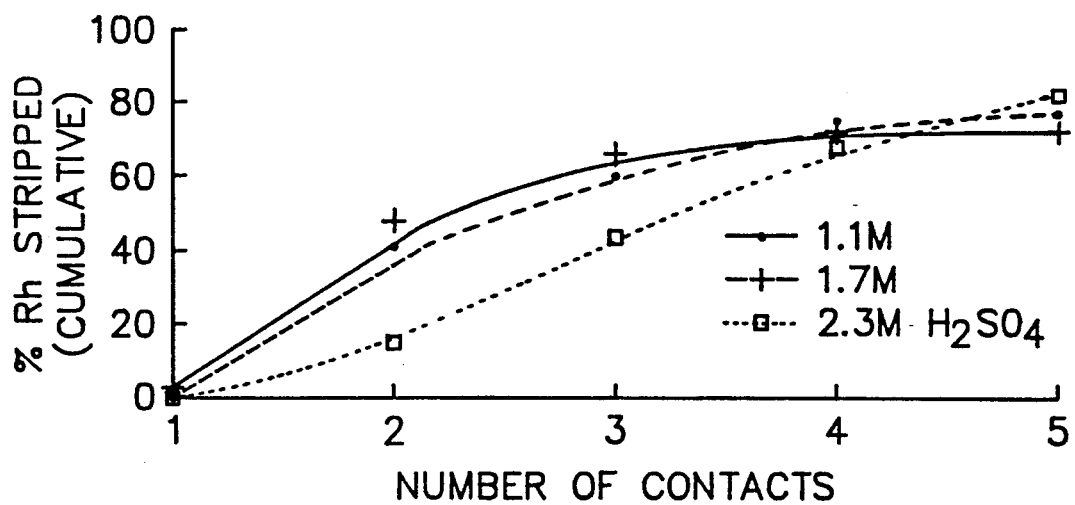
FIG. 20 is a plot showing effects of sulfuric acid concentration on Rh stripping.

It is apparent that the only stripping reagent in these tests which gave satisfactory results is $H_2SO_4$ and this only in the case of Kelex 100. Thus $H_2SO_4$ and Kelex 100 were retained and further stripping experiments were carried out with an aqueous feed composed of 4M Cl⁻, 0.05M Sn(II), 1.4M HCl and about 400 ppm Rh. The effect of the $H_2SO_4$ concentration on the stripping capacity was studied using three different $H_2SO_4$ concentration, 1.1, 1.7 and 2.3M. The results obtained are shown in FIG. 20 at the following process parameters: 2 vol. % Kelex 100, A/O=1, 5 minutes contact, about 350 ppm Rh is loaded organic. After five five-minute contacts, the total % Rh stripped is virtually equivalent for all three solutions, however, in most cases, it would seem that 4 contacts are sufficient to reach the maximum Rh stripped which ranges between 65 and 75%.

After the first contact, there is no stripping of Rh, even for the 2.3M $H_2SO_4$ solution. The reason for this may have to do with the residual Cl⁻ which is coextracted as part of the Rh-Kelex complex. The first $H_2SO_4$ probably serves as a Cl⁻ wash replacing the Cl⁻ in the organic with either $HSO_4^-$ or $SO_4^{2-}$. Only when the Cl⁻ is no longer present does the stripping occur at which point, it is believed that some new type of Rh-$SO_4$ complex forms which is not extractable.

In order to determine whether H⁺ or $SO_4^{2-}$ alone could also strip the loaded organic, strip solutions imitating either the acidity or the sulfate level of the 1.7M $H_2SO_4$ strip solutions were tested. A 1.7M $HNO_3$ solution was tested and it was determined that even after five contacts, no stripping was achieved. It therefore appeared probable that the important functionality in the stripping reaction with $H_2SO_4$ is the sulfate group. A solution of 2M $MgSO_4$ at pH 0.6 was therefore tested as a possible strip solution for the Rh-loaded R-HQ. Surprisingly, this solution also proved incapable of stripping the loaded organic. It seems that it is the combination of both H⁺ and $SO_4^{2-}$ that strips the Rh from the loaded organic.

Figure 21:
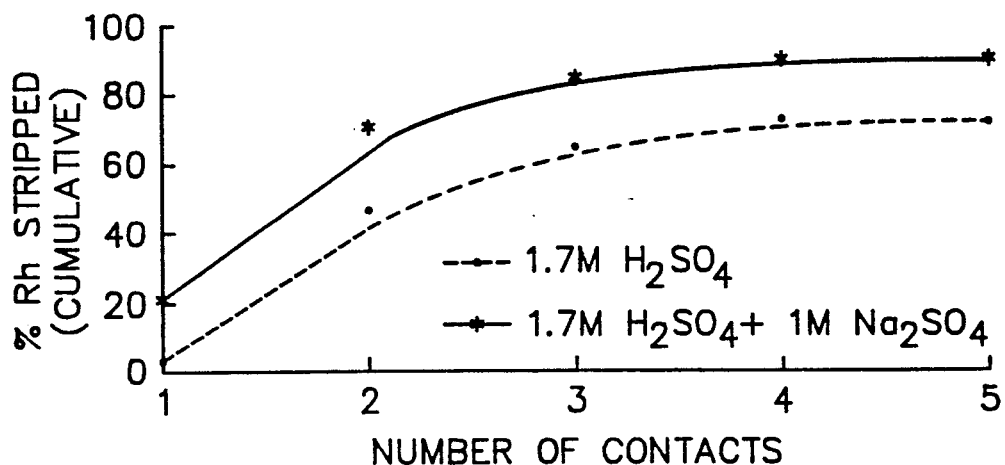
FIG. 21 is a plot similar to FIG. 20.

Although the $H_2SO_4$ stripping was better than all the other reagents tested, 75% stripping is not sufficient to consider the stripping media as being truly effective. Because the $SO_4^{2-}$ or $HSO_4^-$ group may be more important than the proton in the stripping reaction, the addition of a sulfate salt to the 1.7M $H_2SO_4$ strip solution was also tested. A 1.7M $H_2SO_4$+1M $Na_2SO_4$ solution was prepared and the degree of Rh stripping with this solution was tested. The results obtained are presented in FIG. 21 at the following process parameters: 2 vol. % Kelex, A/O=1, 5 minutes contact, about 375 ppm in loaded organic. In fact, the stripping degree is significantly higher at about 90% compared to the original 75%. Also, it can be considered to be complete after 3–4 contacts.

Figure 22:
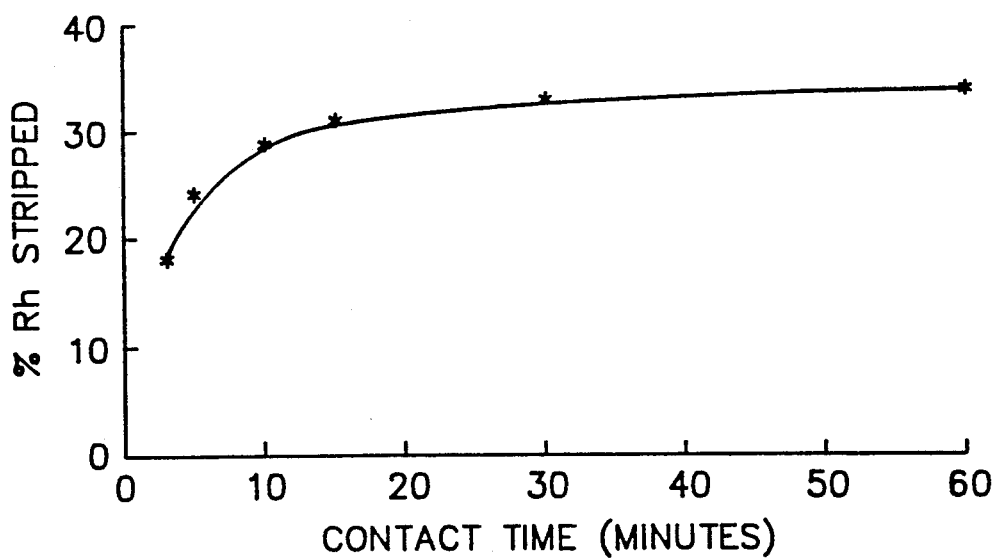
FIG. 22 is a plot showing effect of contact time on Rh stripping.

The effect of contact time on the stripping efficacity of 1.7M $H_2SO_4$+1M $SO_4$ was also tested on the second strip contact for contact times ranging from 3 to 60 minutes. As depicted in FIG. 22, at the following process parameters: 2 vol. % Kelex, A/O=1, about 450 ppm Rh in loaded organic the contact time does seem to have an effect with the stripping degree increasing gradually through the first twenty minutes and then essentially levelling off. The contact time for the stripping tests performed for the other tests was set to five minutes and it therefore seems that the total number of stages for the complete removal of Rh could be lowered from 4 to 3 if the contact time were increased to at least 15 minutes.

d) Stripping of Sn from Loaded 8-Hydroxyquinoline

Figure 23:
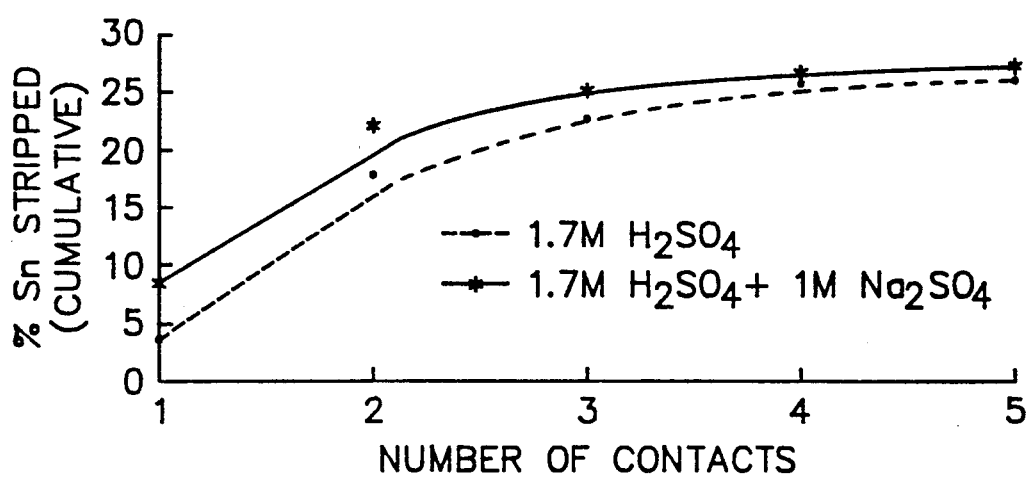
FIG. 23 is a plot showing effect of sulfate ion concentration on Sn stripping.

Because Sn is coextracted with Rh, it is important to study its behaviour in the stripping stage. The amount of Sn stripped with either 1.7M $H_2SO_4$ or 1.7M $H_2SO_4$+1M $SO_4^{2-}$ is shown in FIG. 23 at the following process parameters: 2 vol. % Kelex, A/O=1, 5 minutes contact, about 4300 ppm Sn (0.036M) in loaded organic. Here also, the amount of Sn stripped is slightly higher for the solution containing more total $SO_4^{2-}$.

Figure 24:
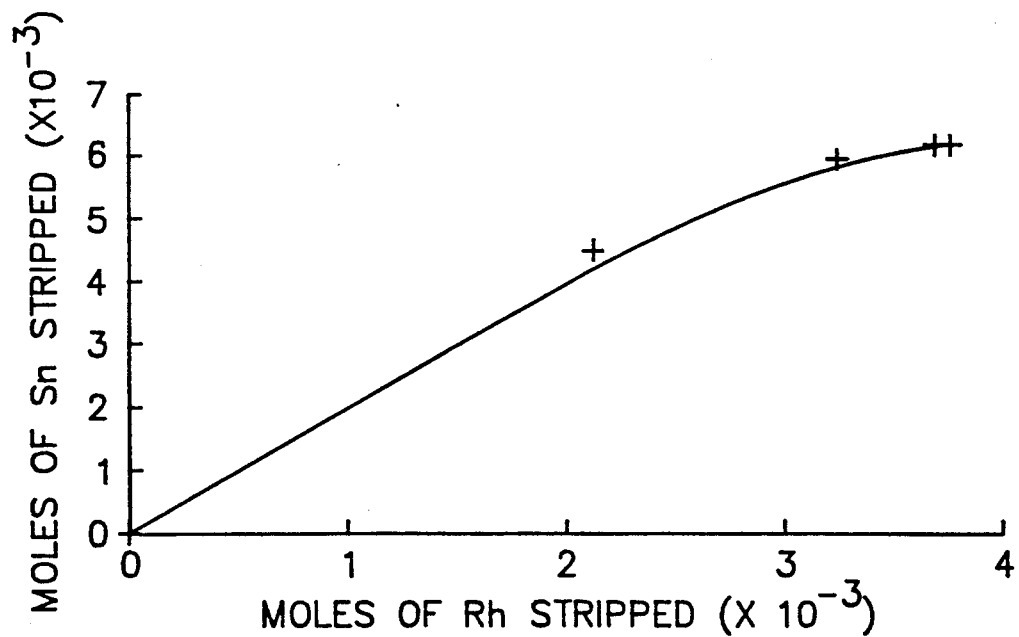
FIG. 24 is a plot showing stripping of Sn v. Rh.

In fact, the amount of Sn stripped was correlated to the amount of Rh stripped as shown in FIG. 24 at the following process parameters: 2 vol. % Kelex, A/O=1, 5 minutes contact, (1.7M+1M) $SO_4$ strip solution. In FIG. 24, the percent stripping data of FIGS. 21 and 23 have been replotted in terms of number of moles stripped for each metal. It is clear that there is a direct relationship between Sn and Rh stripping where 2 moles of Sn are stripped for every mole of Rh. This leads to the supposition that there is a mixed Sn-Rh complex having 2 coordinated Sn atoms per Rh atom which is stripped from the organic phase and it may therefore also be possible that a 2:1 Sn:Rh complex is the type which is extracted in the organic phase. Apparently the excess Sn in the organic is simply extracted as "free" Sn and this is not stripped with $H_2SO_4$.

To further substantiate the above, i.e. that the Sn which is stripped is indeed due to a Rh-Sn interaction and is not simply due to the normal Sn distribution in the 1.7M $H_2SO_4$/Kelex 100 system, the extraction and stripping characteristics of Sn(II) and Sn(IV) were studied under the same conditions used for the Rh-Sn-Cl tests but this time in the absence of Rh. In fact, as expected, the extraction is complete and quantitative for both Sn states but the stripping with 1.7M $H_2SO_4$+1M $Na_2SO_4$ is nil even after five contacts.

As only about 25–30% of the loaded Sn is stripped with the 1.7M $H_2SO_4$ +1M $Na_2SO_4$ solution, it is important to devise a technique by which to strip the excess Sn out of the loaded organic. This was accomplished by adopting a caustic strip solution (1M NaOH). This 1M NaOH solution was found to strip >90% Sn(IV) and about 65% Sn(II) in two five-minute contacts. However, >90% Sn(II) stripping can be achieved in a single 1M NaOH contact if the contact time is sufficiently long (1 hour).

Figure 25:
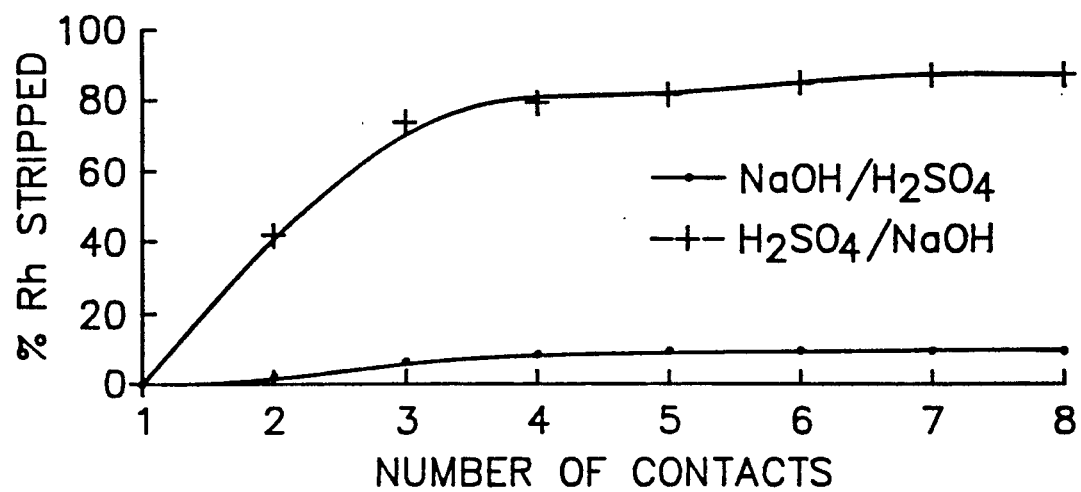
FIG. 25 is a plot showing effect of stripping sequence on Rh stripping.

Because 1M NaOH is a suitable reagent to strip Sn, it was hoped that it would be possible to selectively strip the Sn before the Rh by contacting the loaded organic with two five minute contacts of 1M NaOH to remove the Sn. The Rh could then be stripped with the usual $H_2SO_4/Na_2SO_4$ strip solution. This approach, however, proved unsuccessful, and when this test was performed, it was found that the NaOH contacts somehow transformed the Rh-Sn-loaded organic in such a way that the consequent stripping of Rh with the $H_2SO_4/Na_2SO_4$ media was no longer possible. The Rh had become "immune" to the $H_2SO_4/Na_2SO_4$ contacts once the loaded Kelex had been in contact with NaOH (see FIG. 25). In FIG. 25 the process parameters were as follows: 2 vol. % Kelex, A/O=1, 5 minutes contact, about 325 ppm and 5000 ppm Sn in organic, 2 NaOh(1M) and 6 $SO_4$ (1.7M) contacts.

e) Effect of Recycled Organic on Loading and Stripping

The observed effect that the NaOH strip stages had on the subsequent stripping of the Rh-Sn complex with $H_2SO_4/Na_2SO_4$ (FIG. 25) raised the question if upon recycling (i.e., after a two stage $H_2SO_4/Na_2SO_4$ and NaOH stripping) the solvent would lose either its extraction capacity or strippability. A recycle test was thus performed in which after loading, the organic was stripped of Rh first with $H_2SO_4/Na_2SO_4$ followed by Sn with NaOH and was then washed, reloaded and restripped. The results obtained are shown in Table 3. In fact, the extraction was complete for Rh for both loading stages and the two $H_2SO_4/Na_2SO_4$ stripping stages yielded the usual Rh stripping results. It appears therefore that as long as the Rh-Sn complex is stripped from the organic phase first with the $H_2SO_4/Na_2SO_4$ medium no undesirable complications with the performance of the solvent results. It is also probable, that the organic wash with one three minute contact of 2.7M HCl followed by two three minute contacts with slightly acidified $H_2O$ render the organic effective after every cycle.

TABLE 3

Extraction and Stripping Results for Rh and Sn Using Recycled 2 volume % Kelex 100 (Feed of 400 ppm Rh (about $4 \times 10^{-3}$M), 4M Cl$^-$, 1.7M HCl and 0.05M Sn$^{2+}$)

| Stage | % Rh Extracted or Stripped | % Sn Extracted or Stripped |
|---|---|---|
| 1st Loading | 100 | 85 |
| 1st 1.7M H$_2$SO$_4$ + 1M Na$_2$SO$_4$ Stripping | 0 | 0 |
| 2nd strip | 56 | 9 |
| 3rd strip | 86 | 12 |
| 4th strip | 98 | 12 |
| 5th strip | 99 | 12 |
| 1st 1M NaOH Stripping | 100 | 50 |
| 2nd strip | / | 58 |
| 2.7M HCl wash | / | / |
| 1st H$_2$O wash | / | / |
| 2nd H$_2$O wash | / | / |
| 2nd Loading | 100 | 72 |
| 2nd 1.7M H$_2$SO$_4$ + 1M Na$_2$SO$_4$ Stripping | 1 | / |

TABLE 3-continued

Extraction and Stripping Results for Rh and Sn Using Recycled 2 volume % Kelex 100 (Feed of 400 ppm Rh (about $4 \times 10^{-3}$M), 4M Cl$^-$, 1.7M HCl and 0.05M Sn$^{2+}$)

| Stage | % Rh Extracted or Stripped | % Sn Extracted or Stripped |
|---|---|---|
| 2nd strip | 43 | 9 |
| 3rd strip | 73 | 15 |
| 4th strip | 81 | 16 |
| 5th strip | 83 | 17 | f) Comparison of Stripping Characteristics of TN 2181 and Kelex 100

Figure 26:
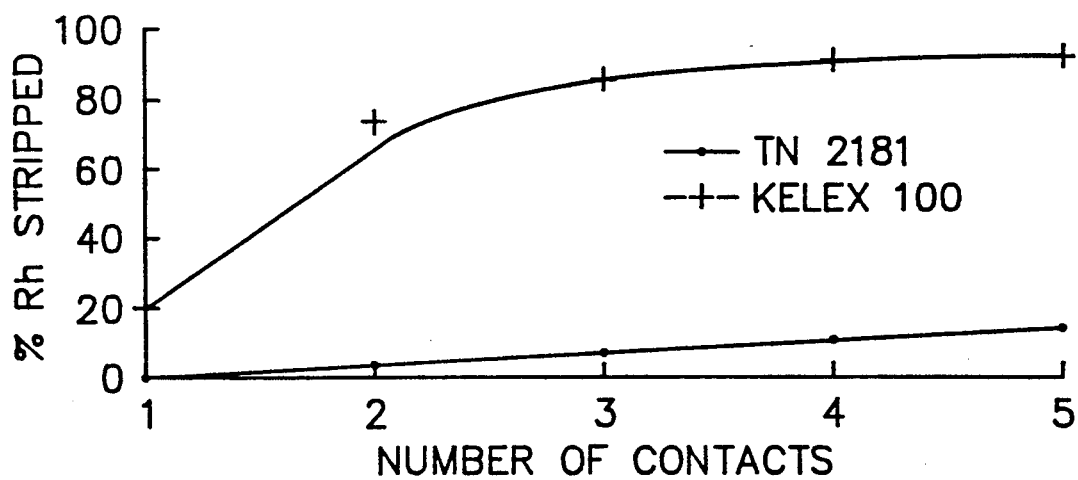
FIG. 26 is a plot comparing strippability from different extractants.

As the results of Table 2 showed, Kelex 100 proved to be a better extractant than TN 2181 for the Rh-Sn-Cl system when stripping performance is considered. This was surprising as both reagents are 7-alkylated 8-hydroxyquinoline derivatives. Thus it was decided to conduct some further stripping tests to substantiate this trend. The results obtained are shown in FIG. 26 at the following process parameters: 2 vol. % extractant, 5 minutes contact, A/O=1, 300 ppm Rh and 4500 ppm Sn in organic 1.7M $H_2SO_4$+1M $Na_2SO_4$ strip solution. As was initially noted, the stripping of Rh from the loaded Tn 2181 could not be achieved with this type of strip solution. The total amount of Rh stripped after 5 contacts was determined in three separate trials to be only between 0 and 15%. However, even in this case (i.e. TN 2181) Sn was found to be stripped at the same molar ratio of 2:1 Sn:Rh as in the case of Kelex 100.

It is difficult to clearly explain the large difference in stripping behaviour between TN 2181 and Kelex 100. It is possible that the complexes formed with TN 2181 are stronger than those with Kelex for both electronic and steric reasons.

As mentioned previously, Kelex 100 and TN 2181 are both 7-substituted 8-hydroxyquinoline reagents. The substituent R group in Kelex 100 is a saturated $C_{11}$ chain with a branch oriented towards the —OH and —N: active sites. However, that of TN 2181 is unsaturated with its branch oriented away from the —OH and —N: sites. This difference in the composition and structure of the R group might be held at least partly responsible for the observed behaviour. In general terms, it may be thought that since Kelex 100 is more sterically hindered than TN 2181, the bond between Kelex and the inorganic extracted complex may be somewhat weaker than that of TN. Also it is probable that the presence of double bonds in the alkyl side-chain somewhat changes the strength of the —OH and —N: active sites due to a change in the electron density of these sites.

g) Effect of Sn:Rh Molar Ratio

Figure 27:
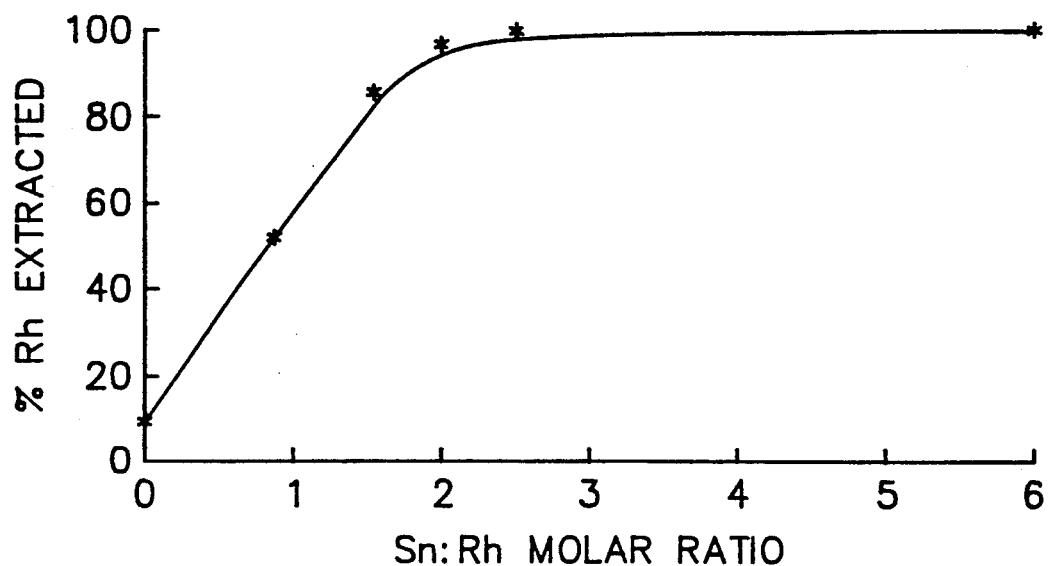
FIG. 27 is a plot showing dependence of Rh extraction on the Sn:Rh molar ratio.

The extraction and stripping tests described above were carried out with about 400 ppm Rh(III) ($4 \times 10^{-3}$M) and 0.05M Sn(II). Industrially, the addition of such a level of Sn(II) may not be considered advantageous, especially since the Sn is quite extensively loaded in the organic along with the Rh. The Sn:Rh ratio was therefore investigated with the intention of lowering it to a more acceptable level. From the stripping results, it was apparent that the Sn:Rh ratio in the strip solutions was 2:1 and therefore, it is reasonable to assume that 2 moles of Sn are extracted and stripped along with every mole of Rh. The Sn:Rh molar ratio was therefore studied from about 15:1 to 1:1. FIG. 27 shows the results obtained to achieve complete Rh extraction and as expected, a molar Sn:Rh ratio of 2:1 is both necessary and sufficient to achieve this. Although the region 6:1 to 15:1 Sn:Rh is not shown in FIG. 27, the Rh extraction remained complete in this region also. In FIG. 27 the process parameters were as follows: 2 vol. % Kelex, A/O=1, 10 minutes contact; Feeds: about 400 ppm Rh, 4M, Cl, 1.7M HCl.

The 2:1 Sn:Rh loaded organic ($1 \times 10^{-2}$M Kelex 100) was subjected to stripping using the usual 1.7M $H_2SO_4$/1M $Na_2SO_4$ medium. Surprisingly, the results showed that the Rh was no longer strippable (less than 0.10% stripping was obtained). Although at the 2:1 molar ratio of Sn:Rh there is enough Sn(II) to allow for complete Rh extraction (FIG. 27), it seems that the complex extracted is such that it cannot be stripped with this medium. The Sn:Rh is therefore obviously of prime importance in determining the amount of Rh extracted and stripped.

A number of Sn:Rh ratios were tested to determine the minimum Sn level with which Rh can be quantitatively stripped with the usual stripping media and the usual five five-minute contacts. The results are shown in FIG. 28 at the following process parameters: 2 vol. % Kelex, A/O=1, 5 minute strip contacts.

Figure 28:
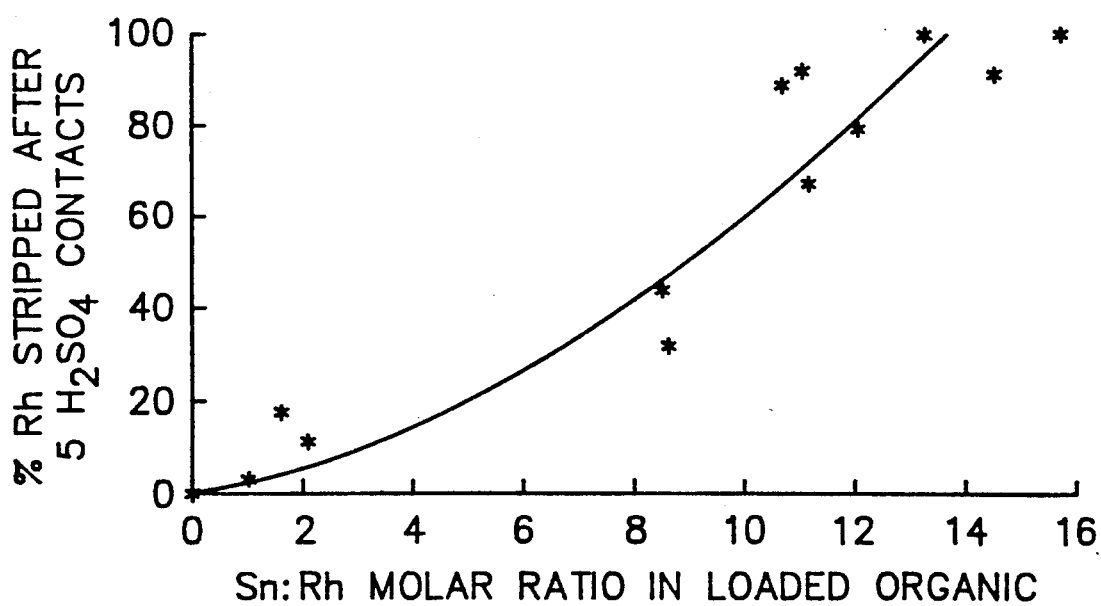
FIG. 28 is a plot showing dependence of Rh stripping on Sn:Rh molar ratio in the extractant solution.

There is a substantial amount of scattering in the results presented in FIG. 28, but the results suggest a molar ratio of at least about 6:1, preferably at least 10:1 is required to achieve, first, quantitative extraction and then, significant stripping. The 10:1 molar Sn:Rh ratio appears, theoretically, to be a little high since in order to get complete $SnCl_3^-$ complexation with Rh, only 6 moles of Sn are required per mole of Rh and it is therefore difficult to explain the role of the "extra" 4 moles of Sn which seem to be required. The necessity for such an excess amount of Sn is even more difficult to explain in light of the fact that the Sn:Rh molar ratio in the Rh strip solutions is only 2:1 and that the "extra" 8 moles of Sn must then be stripped independently with 1M NaOH.

h) Consideration of Extraction—Stripping Mechanism

In terms of the extraction mechanism, it is apparent from FIG. 27 that to achieve complete Rh extraction, at least 2 moles of Sn(II) for every mole of Rh must be supplied in the feed.

The extraction mechanism is difficult to clearly determine from the results obtained for a number of reasons. First, the extraction can be considered as virtually quantitative from 0.7 to 8M HCl and no acidity effect was found (FIG. 17). If the extraction mechanism is ion-pair formation, then usually the feed acidity has an effect since the protonation of the organic is more extensive as the acidity increases. In this system, however, it is possible that 0.7M HCl is sufficient to fully protonate the extractant and if this is indeed the case, then increasing the acidity to higher levels will not have any effect. In fact, in the work performed on the Sn free Rh/R-HQ system, it was believed that in the region 0.7 to 8M HCl, the limiting factor in Rh extraction was the abundance of $RhCl_6^{3-}$ and not the protonation of the organic.

As for the stripping reactions, there are two possible reasons to explain the drop in stripping ease as the Sn:Rh molar ratio in the loaded organic decreases (FIG. 28). It has previously been reported that as the number of $SnCl_3^-$ ligands increases, the bond strength of the Rh-$SnCl_3$ bonds decrease. So, when there is only a 2:1 Sn:Rh molar ratio, it is possible that the bonds between Rh-$SnCl_3$ and Rh-Cl are too strong for $SO_4^{2-}$/$HSO_4^-$ to break them apart (if these two sulfate species are indeed those responsible for the stripping of the loaded Rh).

The second reason may have to do with actual species which form between Rh and Sn. In order for all of the $Cl^-$ ligands to be replaced by $SnCl_3^-$ ligands, the Sn:Rh ratio must be at least 6:1. Although a ratio of 2:1 may be enough to render the Rh "active" enough to extract it, it is likely that the Rh complex still contains 4 $Cl^-$ ligands and, as well, that the Rh is still in the +III oxidation state. It is possible that this octahedral Rh-Cl-Sn complex is unstrippable although it is completely extractable.

By raising the Sn:Rh ratio to 6:1 and higher, the Rh complex becomes $[Rh(SnCl_3)_5]^{4-}$ and this species may be the one which is indeed strippable since this complex has a reactive Rh(I) species, is not octahedral and has a very high charge.

The first $H_2SO_4$/$Na_2SO_4$ strip solution may therefore serve to remove the $Cl^-$ from $R-H_2Q^+Cl^-$ to possibly convert it to $R-H_2Q^+(HSO_4^-)$ and allow the formation of some new type of Rh-Sn-$SO_4$ complex where the molar ratio of Sn:Rh in this complex is 2:1.

i) Flow Sheets

FIGS. 29 to 32 are flow sheets illustrating processes of the invention.

Figure 29:
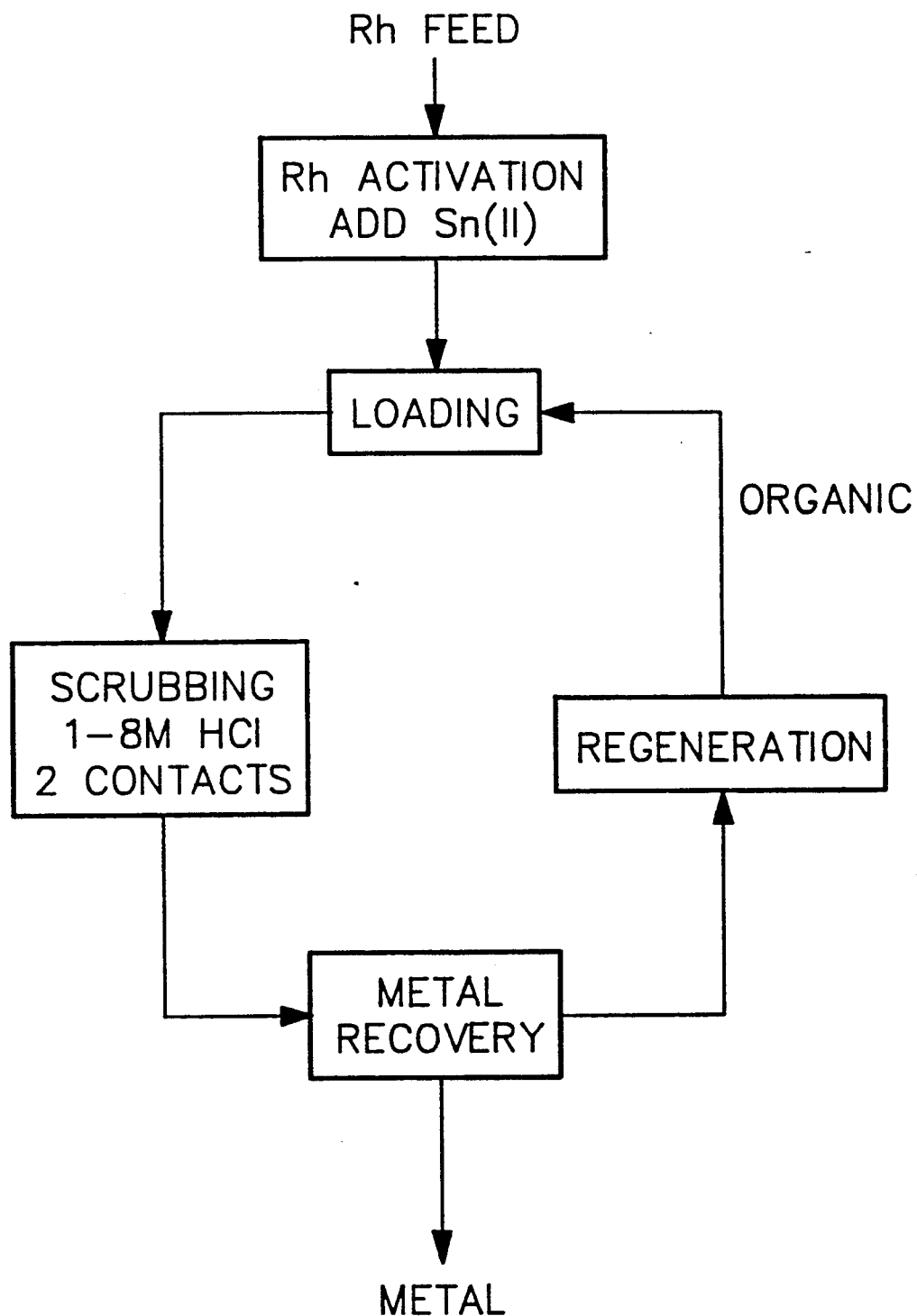

FIG. 29 illustrates a general process with activation of the rhodium in solution with Sn(II), solvent extraction (loading) scrubbing of the organic phase to remove impurities, recovery of rhodium from the organic phase and regeneration of the organic phase and recycling the organic phase of the extractions step.

FIG. 30 is a flow sheet illustrating a process of the invention within FIG. 29 in which the recovery of rhodium employing stripping with a stripping solution of aqueous, sulfuric acid containing sodium sulfate as described herein, with subsequent stripping of Sn from the organic phase and regeneration of the organic phase.

FIG. 31 is a flow sheet illustrating a metal recovery stage for the scheme of FIG. 29, employing optional removal of Sn followed by precipitation of rhodium employing hydrogen gas, with regeneration of the organic phase.

FIG. 32 is a flow sheet illustrating another metal recovery stage for the scheme of FIG. 29 in which Sn is removed from the organic phase and the organic phase is destroyed by burning to leave Rh.

j) Extraction of Rh from Rh-Sn-Cl Aqueous Solutions with 8-Hydroxyquinolines

Rh can be quantitatively extracted with 7-alkylated 8-hydroxyquinoline derivatives from aqueous chloride solutions when these are pretreated with a sufficient quantity of $SnCl_2$. For complete extraction, the Sn to Rh molar ratio must be at least 2:1. It appears that some of the Sn is co-extracted with the Rh as part of a Rh-Sn complex and that any excess Sn (not part of a Rh-Sn complex) is also usually also co-extracted as an impurity. A single ten-minute contact was sufficient to quantitatively transfer the Rh from the aqueous feed to the organic under the conditions tested. Some impurities may be co-extracted with the Rh/Sn complex but these can be removed by scrubbing using hydrochloric acid solution.

The loaded organic can be stripped with 1.7M $H_2SO_4$+1M $Na_2SO_4$ with four five-minute contacts at A/O=1 if the Sn:Rh molar ratio in the loaded organic is sufficiently high (at least 10:1). Here also, the Rh and the Sn follow one another as they are co-stripped at a Sn:Rh molar ratio of 2:1. The excess Sn in the organic which is not co-stripped with the Rh can be removed with a single hour-long 1M NaOH contact. The barren organic can then be recycled for further use after washing with HCl and $H_2O$.

We claim:

1. A method of recovering rhodium from an aqueous solution containing rhodium comprising:
   i) contacting an aqueous solution containing rhodium with stannous chloride at a Sn:Rh molar ratio of at least 2:1 to produce an activated Rh solution,
   ii) solvent extracting rhodium from the activated solution with an organic extractant in an organic vehicle with formation of an aqueous phase, derived from said aqueous solution, of diminished Rh content, and an organic phase containing Rh, and
   iii) recovering rhodium from the organic phase.

2. A method according to claim 1, wherein step iii) comprises contacting the organic phase containing rhodium with hydrogen gas at a temperature of 25° C. to 200° C.; and a hydrogen pressure of 1 to 20 atmospheres.

3. A method according to claim 2, including scrubbing the organic phase containing rhodium with hydrochloric acid to remove impurities and washing the scrubbed organic phase with sodium hydroxide solution to remove tin, between steps ii) and iii).

4. method according, to claim 1, in which said extractant is in a concentration of 0.5 to 30 vol. % in said vehicle.

5. A method of recovering rhodium from an aqueous solution containing rhodium comprising:
   a) contacting an aqueous solution containing rhodium with stannous chloride at a Sn:RH molar ratio of at least 2:1 to produce an activated Rh solution
   b) solvent extracting rhodium from the activated solution with organic extractant in an organic vehicle with formation of an aqueous phase, derived from said aqueous solution, of diminished Rh content, and an organic phase containing Rh,
   c) stripping Rh from the organic phase at a Sn:Rh molar ratio of at least 6:1, to produce an Rh-containing strip solution, and
   d) recovering rhodium from the strip solution.

6. A method according to claim 5, wherein said Sn:Rh molar ratio in i) is at least 10:1.

7. A method according to claim 5, wherein said Sn:Rh molar ratio in i) is at least 10:1 and said Sn:Rh molar ratio in iii) is at least 10:1.

8. A method according to claim 5, in which said extractant is in a concentration of 0.5 to 30 vol. % in said vehicle.

9. A method according, to claim 8, wherein said extractant is selected from basic metal extractants having a nitrogen, oxygen or sulfur atom with a lone pair of electrons.

10. A method according to claim 8, in which said extractant is selected from 8-hydroxyquinolines of formula (I):

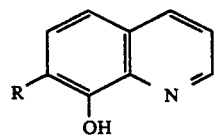

in which R is a saturated or unsaturated, linear or branched aliphatic radical of 8 to 15 carbon atoms.

11. A method according to claim 5, in which said stripping is carried out with an aqueous sulfuric acid solution having a concentration of 1 to 2.5M by contacting the organic phase in c), with said aqueous sulfuric acid solution, for a plurality of short duration contacts between said sulfuric acid solution and said organic phase.

12. A method according to claim 11, in which said aqueous sulfuric acid solution contains a soluble sulfate of a metal of Group I or II of the Periodic Table.

13. A method according to claim 5, including a step of stripping Sn from the organic phase recovered from step c) and recycling said organic phase to step b).

14. A method according to claim 13, in which the Sn is stripped with sodium hydroxide solution.

15. A method according to claim 5, including scrubbing the organic phase containing rhodium with hydrochloric acid to remove impurities between steps b) and c).

16. A method according to claim 14, in which said organic phase is regenerated after the Sn stripping by successive contacts with aqueous hydrochloric acid prior to said recycling.

17. A method of recovering rhodium from an aqueous solution containing rhodium comprising:
    a) contacting an aqueous precious metal solution containing rhodium, with stannous chloride at a Sn:Rh molar ratio of at least 10:1 to produce an activated Rh solution;
    b) solvent extracting rhodium from the activated Rh solution with an extractant in an organic vehicle said extractant being an 8-hydroxyquinoline derivative present in a concentration of 0.5 to 30 vol. %, to form an aqueous phase derived from said aqueous solution, of diminished Rh content, and an organic phase containing Rh,
    c) stripping Rh from the organic phase with an aqueous solution of sulfuric acid, at a Sn:Rh molar ratio of at least 10:1, to produce an Rh-containing strip solution, and
    d) recovering rhodium from the strip solution.

18. A method according to claim 17, in which said sulfuric acid has a concentration of 1 to 2.5M.

19. A method according to claim 18, in which said sulfuric acid contains sodium sulfate at a concentration of 0.75 to 1.5M.

20. A method according to claim 19, including the step of
    e) stripping Sn from the organic phase recovered from step c).

21. A method according to claim 20, in which said stripping in step e) is carried out with sodium hydroxide solution having a concentration of 0.5 to 2.0M.

22. A method according to claim 21, including recovering an organic phase from step e) and recycling the recovered organic phase to step b) for said solvent extracting.

* * * * *